US006324378B1

(12) United States Patent
Schlossberg

(10) Patent No.: US 6,324,378 B1
(45) Date of Patent: Nov. 27, 2001

(54) INTERACTIVE LEARNING CENTER

(75) Inventor: Edwin Schlossberg, New York, NY (US)

(73) Assignee: Chicago Symphony Orchestra, Chicago, IL (US)

( * ) Notice: Subject to any disclaimer, the term of this patent is extended or adjusted under 35 U.S.C. 154(b) by 0 days.

(21) Appl. No.: 09/235,115

(22) Filed: Jan. 21, 1999

(51) Int. Cl.[7] ....................................................... G09B 5/06
(52) U.S. Cl. ..................... 434/307 R; 84/609; 84/470 R; 434/323
(58) Field of Search ............................. 434/307 R, 307 A, 434/118, 365, 322, 323; 84/609, 470 R; 345/302

(56) References Cited

U.S. PATENT DOCUMENTS

| | | | | |
|---|---|---|---|---|
| 5,002,491 | * | 3/1991 | Abrahamson et al. | 434/322 X |
| 5,395,243 | * | 3/1995 | Lubin et al. | 434/118 X |
| 5,533,903 | * | 7/1996 | Kennedy | 434/307 R |
| 5,690,496 | * | 11/1997 | Kennedy | 434/307 R |
| 5,746,605 | * | 5/1998 | Kennedy | 434/307 R |
| 5,833,468 | * | 11/1998 | Guy et al. | 434/350 X |
| 5,839,905 | * | 11/1998 | Redford et al. | 434/307 R |
| 5,957,698 | * | 9/1999 | Dean et al. | 434/350 X |
| 6,072,113 | * | 6/2000 | Tohgi et al. | 84/470 R |
| 6,086,380 | * | 7/2000 | Chu et al. | 434/307 A |
| 6,211,451 | * | 4/2001 | Tohgi et al. | 84/470 R |

* cited by examiner

Primary Examiner—Valencia Martin-Wallace
Assistant Examiner—Chanda Harris
(74) Attorney, Agent, or Firm—Mayer, Brown & Platt

(57) ABSTRACT

A learning system is disclosed which allows student interaction and student creation of a composition. The system has a series of multi-media interactive booths which are grouped in stations with different themes related to a general subject. Each booth has a number of multi-media based lessons relating to the theme of the station. Students are supplied with a control box which may be carried by the student as they move from booth to booth. The control box allows a student to play a musical composition. The musical composition is stored by a central computer and uniquely assigned to a database record associated with the specific control box. The central computer also keeps track of the number of booths and lessons which have been completed by the specific control box. Each booth has a number of specific programs which teach students by interactive input. After completing a certain number of booths, students may combine their compositions at an orchestra wall which will play the stored composition in conjunction with a prearranged musical composition.

23 Claims, 31 Drawing Sheets

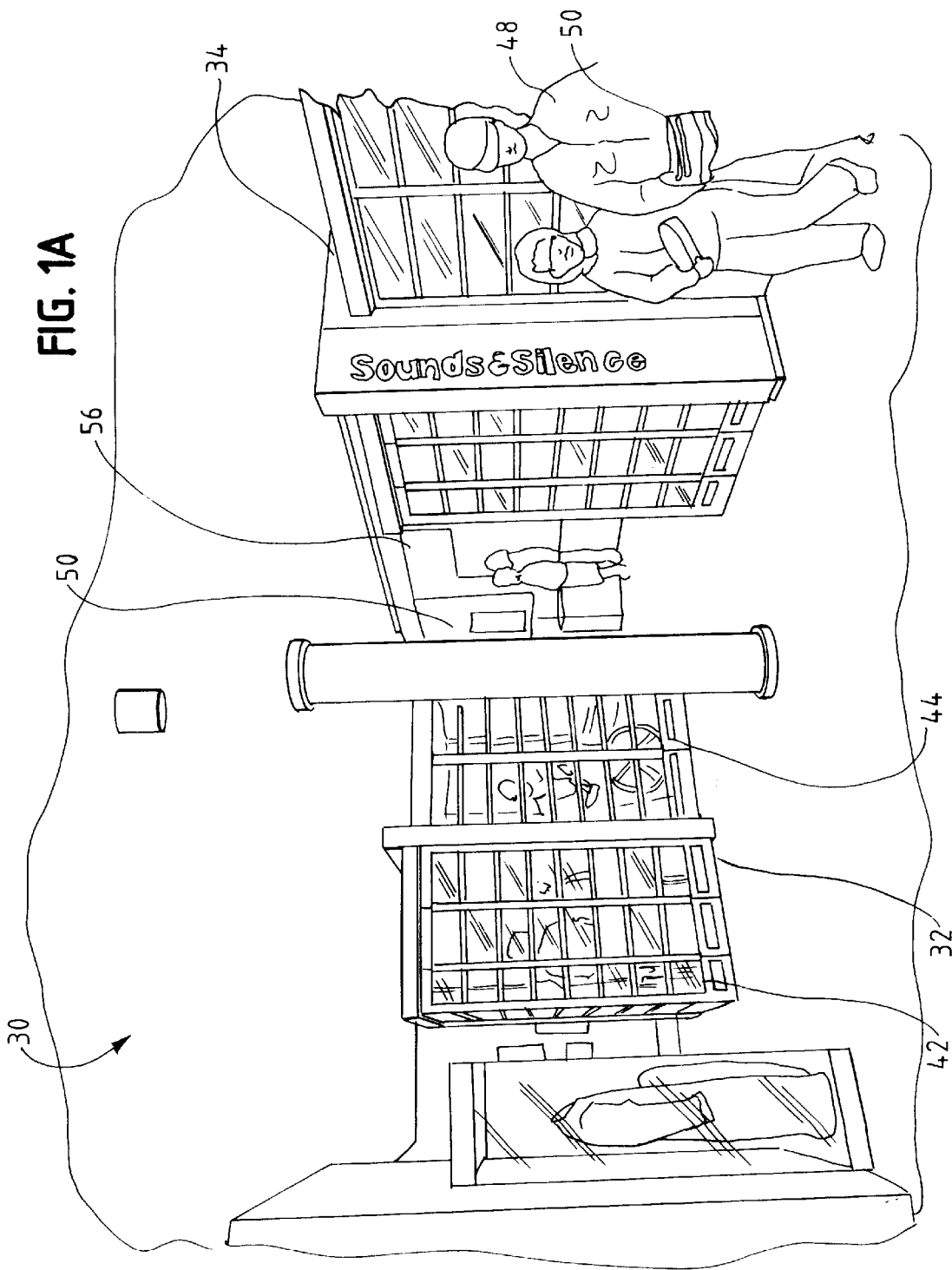

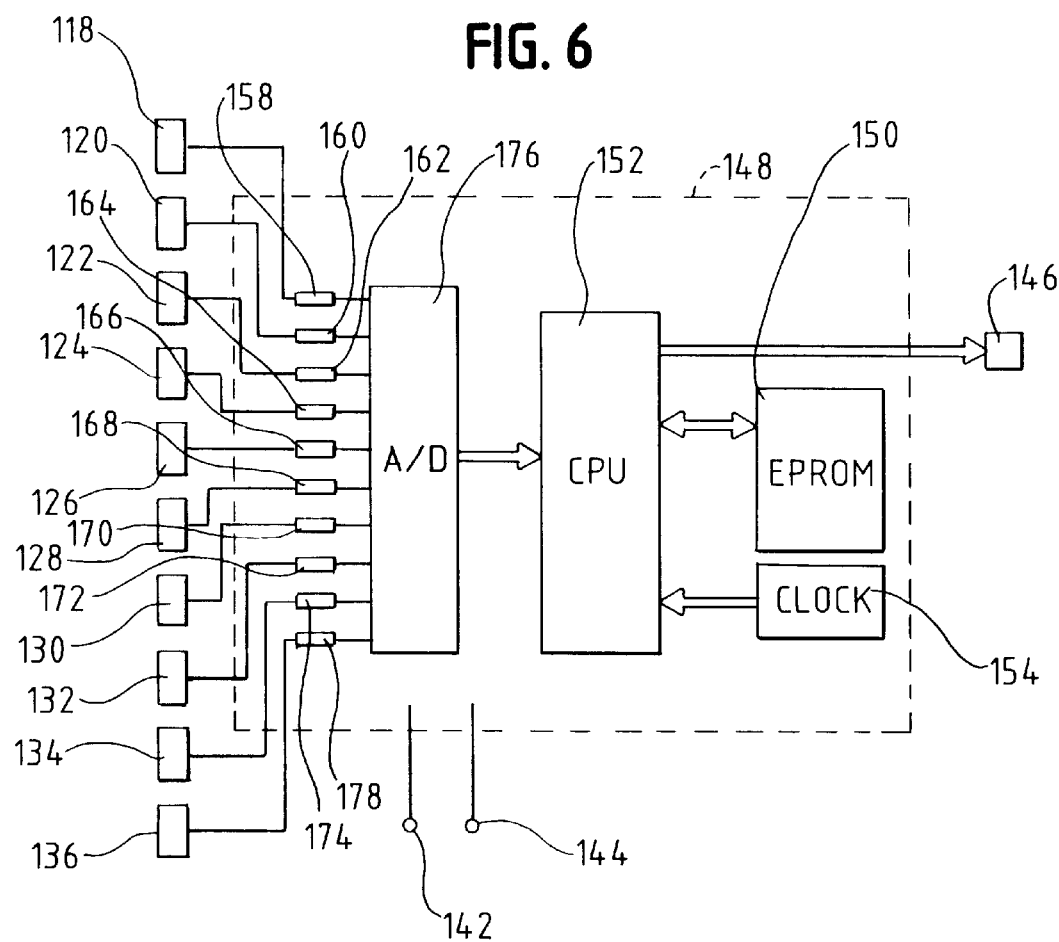

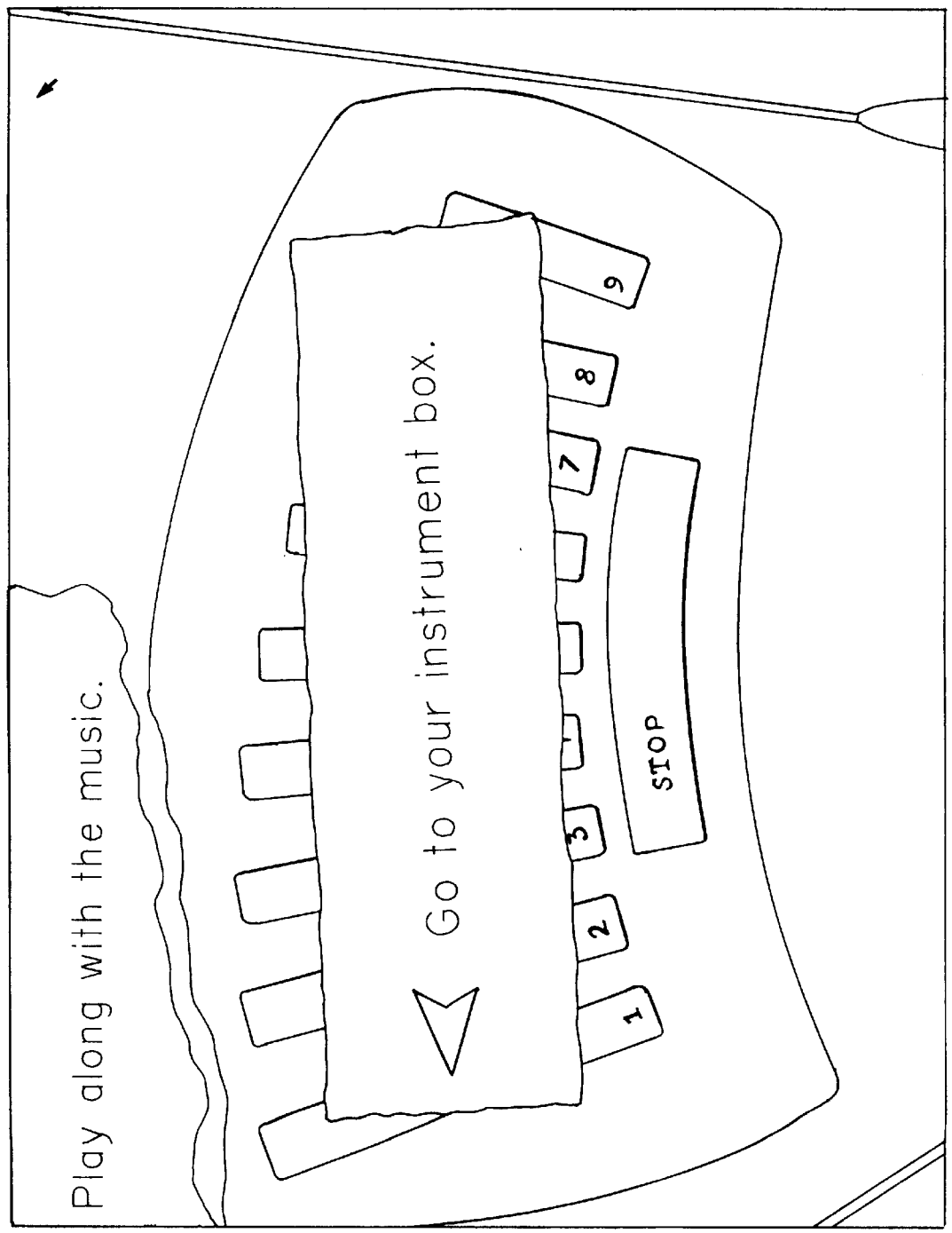

INTERACTIVE LEARNING CENTER

FIELD OF INVENTION

This invention relates to an interactive learning center which uses a multi-media system for educating students on a certain subject. More specifically, this invention relates to an interactive system having multi-media stations teaching different lessons, which allows a student to input and store their compositions using a portable control device.

BACKGROUND OF INVENTION

Currently, educational introduction to many fields such as art, music, history, science, etc. is accomplished by specialized facilities such as learning centers or museums. The purpose of these facilities is to generate and stimulate interest among the general public and more particularly students in the particular field. Current museums utilize standing displays which demonstrate exhibits and provide information in the form of text and graphics. Such displays cannot necessarily hold the attention span of students and thus were not efficient in garnering interest or supplying information.

In order to further interest, various means were developed to further enhance the communication of information. One mechanism was the use of television or film in order to hold student attention and further interest. Such means were more effective than simple graphical or printed media; however, it was found that interaction between a student and a display increases communication effectiveness. Such interaction also enables a student to directly participate in the activity, thus increasing interest and curiosity.

In order to increase effective communication of information, various interactive multi-media displays have been proposed. These include displays which allow a user to select information by buttons, touch screens or switches. More advanced displays have a number of options which use visual or audio cues to engage a user. However, there have not been any truly interactive systems because the displays are limited in information and feedback which may be supplied by a user. Moreover, the displays must stand by themselves and are, thus, also limited to the information contained in that particular display. A user cannot use information learned at different displays to interact with other displays based on the information previously learned. Additionally, such displays must keep a user moving at a set pace which may or may not be compatible with an individual student's learning aptitude.

Thus, there exists a need for a system which allows individual users to have a common control device for interactive multi-media stations. There is also a further need for a universal interface to allow a user to manipulate sounds or visual images with a portable controller. There is also a need for a learning system with multiple stations to allow users to learn different lessons. There is additionally a need for a learning system which keeps track of a user's progress through various learning stations and adjusts further lessons accordingly. There is a further need for an interactive learning system which permits adjustment of various lessons according to user feedback.

SUMMARY OF THE INVENTION

The present invention is embodied in a learning facility for teaching multiple lessons on a subject to students. The facility has a booth with physical space to accommodate at least one student. A processor is located in the booth and a memory device and interface connector are coupled to the processor. A speaker is mounted in the booth and coupled to the processor. A display is mounted in the booth and coupled to the processor. An interface connector is coupled to the processor. A removable control device may be carried by a student and the control device is matable with the interface connector. The control device has a coupler for data communication with the processor and further has student operated inputs. The processor is configured to respond to the student operated inputs to produce a multi-media response.

The invention is also embodied in a system for teaching different lessons relating to music to a student. The system has a control box with an adaptor, an input device and a memory which stores a unique identification data field. The system also includes a plurality of instruction booths, each with a booth computer. The instruction booths have sufficient physical space for accommodating at least one student. Each booth has a display, a speaker, a connector for electrical connection to the control box and a user input device. Each booth also has a memory device for storing lesson programs with display and speaker data outputs. The lesson programs are interactive through the user input device and the control box and teach students various preplanned lessons. A processor loads and plays the lesson programs and reads student operated data input from the user input device. A central computer is coupled to each of the computers in the instruction booths. The central computer has a database with a record corresponding with each control box. The record includes storage of student input data and data indicating completion of program lessons by the student.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 1A is a perspective view of a learning facility according to the present invention.

FIG. 6 is a block diagram of the circuit board installed in the instrument control box.

FIGS. 15A–15E are a series of screen prints for the second instrument lesson program segment.

DESCRIPTION OF THE PREFERRED EMBODIMENT

Figure 1B:
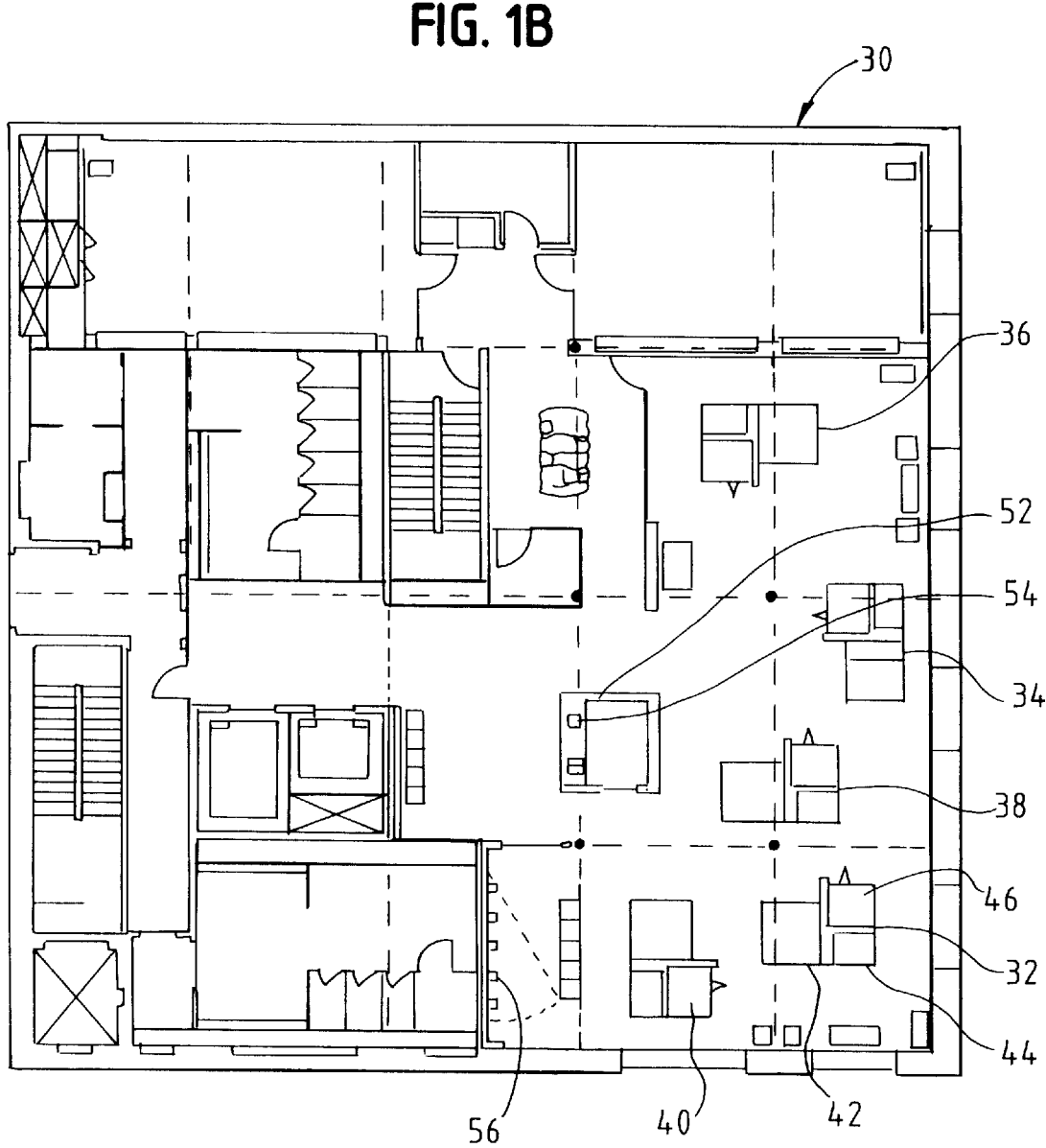
FIG. 1B is a top plan view of the learning facility according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIG. 1A which shows a perspective view and FIG. 1B which shows a top view of a learning facility 30 for teaching multiple lessons on a subject to students. The learning facility 30 is embodied in a number of different learning stations 32, 34, 36, 38 and 40 which are each directed to different aspects of the general subject. Each station may have a number of booths such as booths 42, 44 and 46 which are part of station 32. Each booth such as booths 42, 44, and 46, has physical space to accommodate one to three students for individual instruction.

The booths of the learning stations 32–40 are visited by students 48 who each carry a removable control device such as an individual control box 50. The individual control box 50 is connected to the booths of each station 32–40 in order to allow an individual student to complete an instructional session or sessions received at the particular station 32–40. The control box 50 also allows a student to create and store a project utilizing certain instructional sessions at the booth.

The control boxes 50 are distributed to visiting students by employees at an administrative station 52. The administrative station 52 contains physical storage space for control boxes which are not in use. The employees at the administrative station 52 monitor the operation and students at the learning facility 30. The administrative station 52 has a central server computer 54 with a database to track each control box which will be explained below. After visiting a specific number of the stations 32–40, the students may apply their completed creations from the stations 32–40 by attaching their control boxes 50 to a combined display 56.

The preferred embodiment of the present invention is a facility directed toward the study and appreciation of music. The facility 30 may be used in conjunction with other events (classes, tours, concerts and the like) sponsored by a musical organization such as a symphony. It is to be understood that the principles of the present invention may be applied to other educational fields which may utilize multi-media, interactive teaching tools such as art, history, science etc.

In the preferred embodiment, each station 32–40 represents a different theme designed to educate students on different aspects of music. Each station plays a number of interactive sessions related to the specific theme. All of the booths in stations 32–40 will present the same interactive sessions of the theme of the particular booth. For example, station 32 is directed toward the theme of Teams; station 34 is directed toward the theme of Sounds and Silence; station 36 is directed toward the theme of Mapping and Recording; station 38 is directed toward the theme of Links (associations); and station 40 is directed toward the theme of Celebrations And Time.

It is to be understood that booths 42–46 of a particular station such as station 32 may use various interactive sessions to teach lessons on the various aspects of the theme. Each session is a separate interactive unit which accepts inputs from the individual control box 50. One advantage of the present invention is the ability to change the presentation of the themes in different sessions or lessons, each requiring student interaction through the control box 50. The hardware associated with each station 32–40 may be reprogrammed by appropriate substitution of software to create new learning sessions or lessons.

Figure 2:
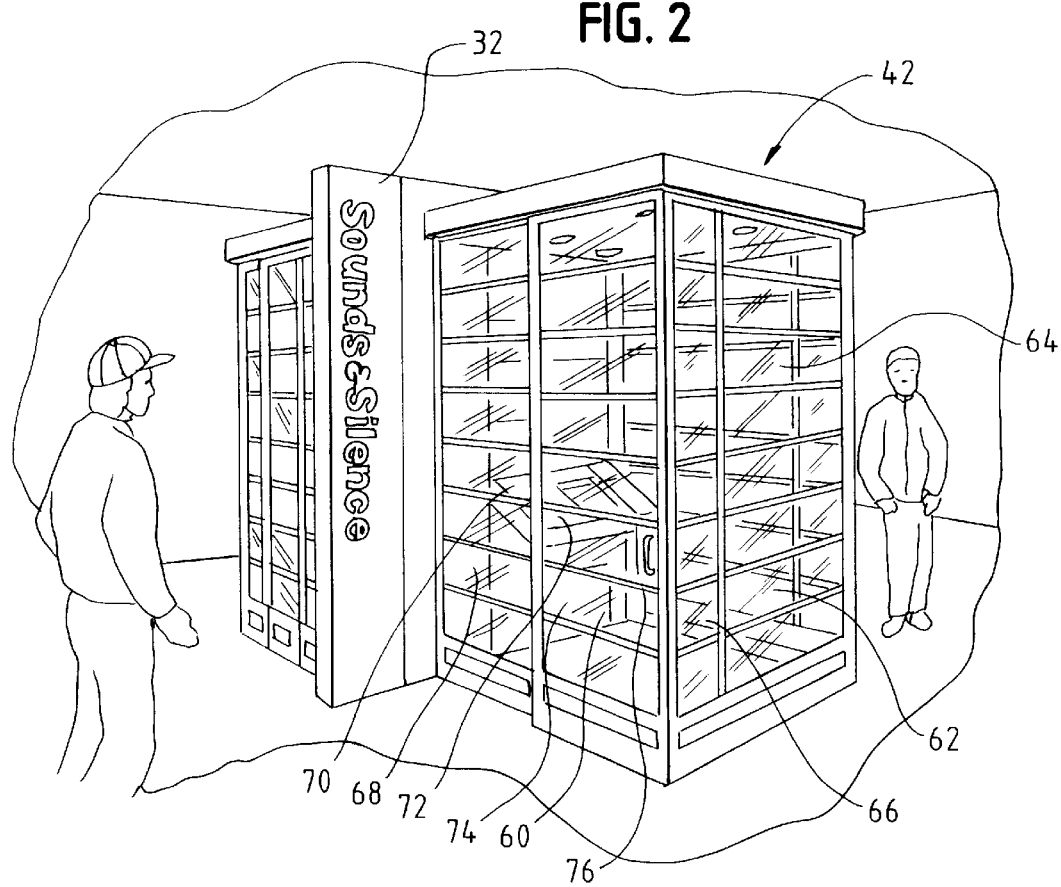
FIG. 2 is an exterior perspective view of a booth according to the present invention.
Figure 3:
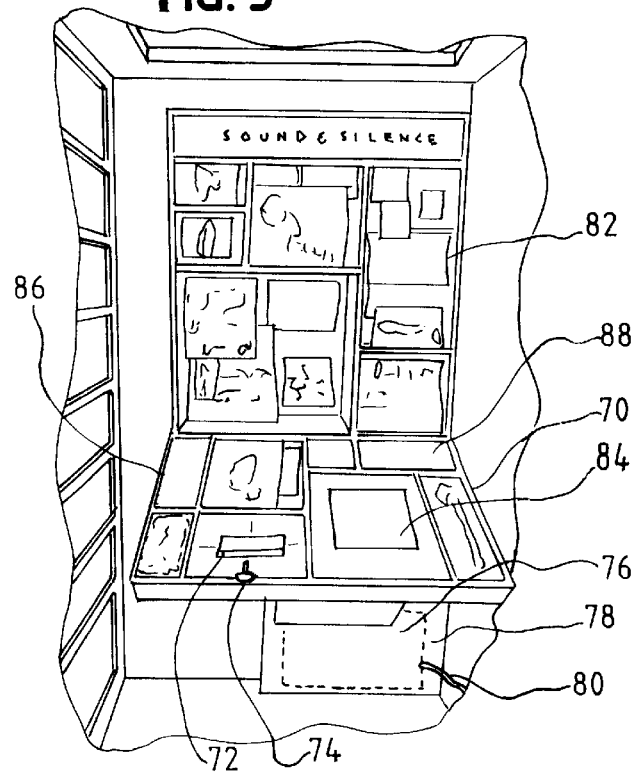
FIG. 3 is a an interior perspective view of the booth in FIG. 2 according to the present invention.

FIG. 2 shows an exterior perspective view and FIG. 3 shows an interior perspective view of the booth 42 which is part of the station 32. It is to be understood that any number of booths may teach the same lessons embodied in interactive software. For example, the three booths 42–46 of the station 32 are identical in software and hardware. By way of description, the booth 42 has a number of walls 60, 62 and 64 which form an enclosed area 66, providing a student shielding against outside noise. The booth 42 has sufficient physical space to accommodate up to three students. Of course, larger or smaller booths may be used. The walls 60–64 are made of clear material such as glass with support beams arranged in an aesthetically pleasing design. A sliding door 68 allows the student or students access to booth 42.

When seated, the student faces an operating counter 70 at approximately waist level. An interface coupler such as a control box interface coupler shoe 72 is installed on the operating counter 70 within reach of the student's hands. The control box 50 is matable with the interface coupler shoe 72 during operation of the booth 42. The control box 50 has a coupler for data communication with the booth computer 76. The control box 50 may be locked or released by depressing a tab 74 on the edge of the counter 70.

The counter 70 extends over a storage cabinet 78 which contains a booth computer 76. The computer 76 is a specially adapted Macintosh Power PC type personal computer with a 200 MHz Motorola processor. The booth computer 76 is connected by cable 78 to the central server 54 (not shown). The cable 78 is a Category 5 twisted pair wire suitable for Ethernet connections; however, other network data cabling may be used. A display surface 82 rises vertically above the counter 70 and may be decorated with graphics and instructional text relating to the theme of the station 32.

A fixed student operated input device such as a touch screen display 84 is installed on the counter 70. The touch screen 84 allows a user to interact with various graphical images displayed by the computer 76 on the screen 84. A set of audio speakers 86 and 88 are installed on either side of the touch screen 84. The speakers 86 and 88 and the display 84 are coupled to the booth computer 76. The booth computer 76 has MIDI drivers and other sound hardware devices which allow various sounds to be output from the speakers 86 and 88. Additionally, the booth computer 76 has the appropriate hardware such as a graphics and/or video card to display high-quality graphics and accept touch screen inputs from the touch screen display 84. Alternatively, the booth computer 76 may have an optional keyboard (not shown) or track ball (not shown) to allow a student to provide input data.

As will be explained below, a student may manipulate graphics on the display 84 and sounds from the speakers 86 and 88 in accordance with interactive programs stored in the booth computer 76. The student may input commands using the touch screen display 84 and the control box 50. Alternatively, the student may use an optional keyboard or track ball to input data and react to the interactive programs.

Figure 4:
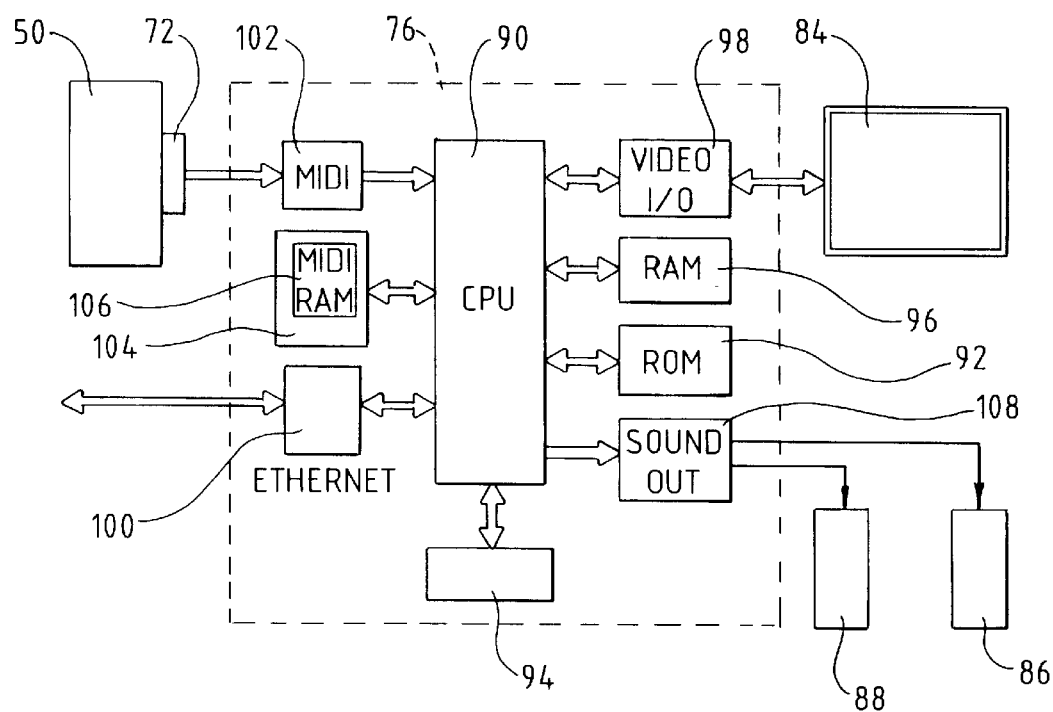
FIG. 4 is a block diagram of the hardware components of the booth computer according to the present invention.

FIG. 4 is a block diagram of the computer 76 used in each of the booths 42–46 of the station 32 shown in FIGS. 2 and 3. The computer 76 has a central processing unit (CPU) 90 having basic operating instructions stored in read only memory (ROM) 92. Software which is directed toward CPU 90 to become a hardwired circuit having the functions explained below, such as a circuit being capable of responding to student operated inputs to produce a multi-media response, is stored in a permanent memory device such as a hard drive 94. Different software programs are loaded from ROM 92 or the hard drive 94 into a random access memory (RAM) 96 for operation of the CPU 90. The hard drive 94 is of sufficient size to store the operating software as well as digital audio files, graphics files and digital video or "movie" files for use by the booth computer 76. The hard drive 94 holds multi-media programs which allow output data through the display 84 or the speakers 86 and 88.

In the preferred embodiment, various audio files are stored in either MIDI, AIFF, or SND Digidesign Sound Designer 2 format. Graphics are stored in TARGA format. Of course other formats, such as JPEG, TIFF, BMP etc., may be used for graphics, and formats such as WAV or MP3 may be used for audio recordings. Additionally, digital video may be stored and displayed using formats such as AVI, QuickTime, MPEG etc. Any large capacity, permanent memory such as a compact disc, tape, ZIP drive or the like may be used for memory 94. As has been explained, the CPU 90 is a Motorola Power PC type processor used with a standard Apple Macintosh Power PC type personal computer. However, any suitable computer such as an Intel-based personal computer or workstation may be used for computer 76.

The present invention involves the use of several hardware modifications to a standard Macintosh-type personal computer to be used as the booth computer 76. A touch screen interface 98 provides input and output data from the display 84 to the CPU 90. The CPU 90 is also coupled to a network interface such as an Ethernet card 100 which provides communication of data to and from the central server 54 (not shown).

A MIDI interface 102 has an input coupled to the coupler shoe 72. The MIDI interface 102 has an output coupled to the CPU 90 and provides MIDI data from the individual control box 50. A MIDI sampling card 104 is provided, which has a dedicated MIDI random access memory (RAM) storage 106 for different MIDI sounds. The MIDI sounds are loaded in the MIDI RAM storage 106 from a permanent data storage device such as hard drive 94. The MIDI sampling card 104 provides quicker access to the MIDI data for the CPU 90. The MIDI sampling card 104 may be any suitable MIDI sampling card such as one manufactured by DigiDesign. A sound card 106 may be connected between the CPU 90 and the speakers 84 and 86.

Figure 5A:
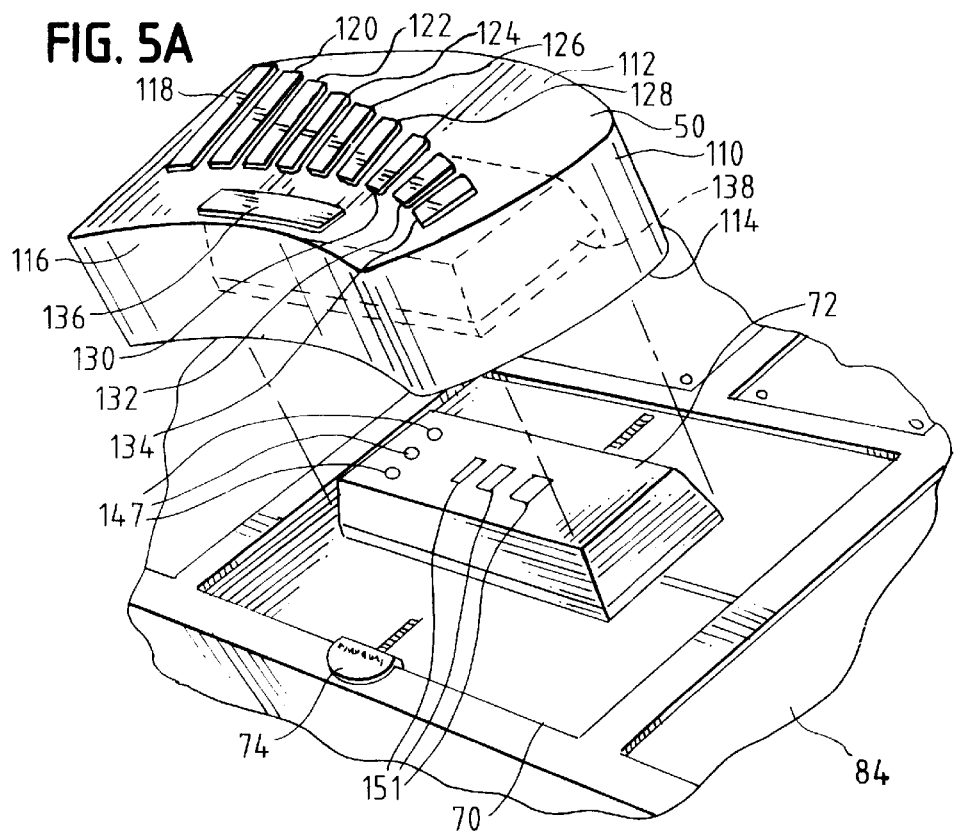
FIG. 5A is a perspective view of an instrument control box according to the present invention connected in a booth.
Figure 5B:
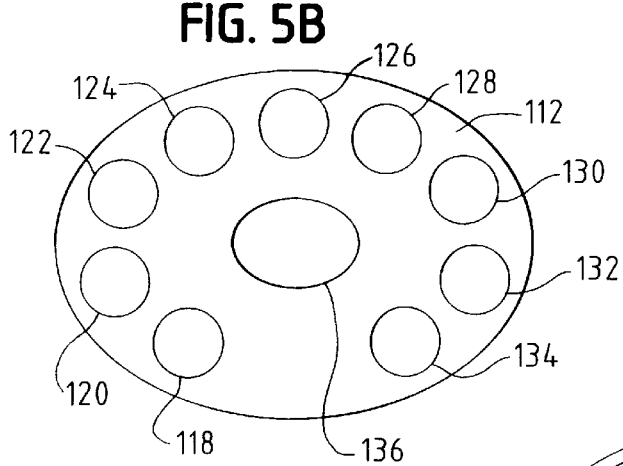
FIG. 5B is a top view of an instrument control box according to the present invention.
Figure 5C:
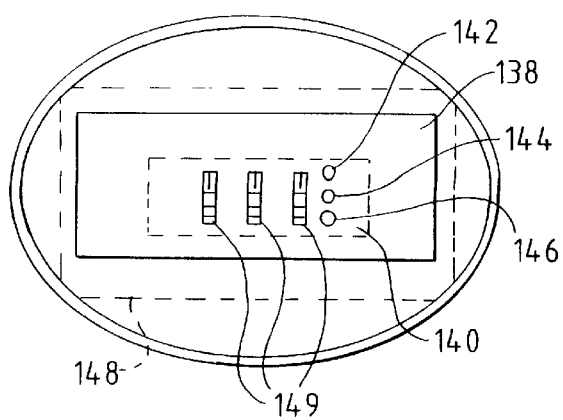
FIG. 5C is a bottom view of the instrument control box according to the present invention.

FIG. 5A shows a perspective view of the control box 50 and the coupler shoe 72 on the counter 70. FIG. 5B shows a top view, and FIG. 5C shows a bottom view of the control box 50. The control box 50 is preferably constructed of wood although plastic or other solid, sturdy materials may be used. The control box 50 may be formed in the shape of an object associated with the educational theme for aesthetic effect. The control box 50 may also be painted in attractive colors and patterns. In the preferred embodiment, the control box 50 in FIGS. 5A–5C is formed in the shape of a musical instrument such as a drum.

The control box 50 has a top surface 110 which is supported by a side wall 112. A removable back surface 114 is attached to the side wall 112. The interior of the side wall 112 and the top surface 110 forms an interior chamber 116 of the box 50.

The top surface 110 has student operated inputs such as nine note pads 118, 120, 122, 124, 126, 128, 130, 132 and 134. The nine note pads 118–134 are arrayed in a semi circular pattern around the top surface 110. A special effect pad 136 is located in the middle of the nine note pads 118–134. The back surface 114 has an aperture 138 which permits the passage of a socket 140. The aperture 138 fits snugly over the coupler shoe 72 of the counter 70.

The socket 140 forms a connection which allows MIDI data input from the note pads 118–134 through the coupler shoe 72 of any booth such as booths 42–46. The socket 140 also provides power to the circuitry of the control box 50. The socket 140 has a positive voltage terminal 142, a ground terminal 144 and a MIDI signal terminal 146. The terminals 142, 144 and 146 are spring loaded to electrically contact terminals 147 on the coupler shoe 72 as shown in FIG. 5A. Three catches 149 are mounted in the socket 140 to mate with couplers 151 on the coupler shoe 72 to physically connect the control box 50 to the coupler shoe 72. The socket 140 is coupled to a circuit board 148 which is mounted in the interior chamber 116 of the box 50. The circuit board 148 contains the MIDI circuitry which allows the control box 50 to act as a MIDI controller.

FIG. 6 is a circuit block diagram of the MIDI circuitry which is mounted on the circuit board 148 in the control box 50. The circuit board 148 has an EPROM chip 150 which contains the operating software for translating inputs from the note pads 118–134 and special effect pad 136 into the MIDI data format. The EPROM 150 also holds unique identification data for the control box 50. Of course other memory means may be used for EPROM chip 150 such as a ROM, EEPROM, hardwired circuit, ASIC or the like. Additionally, the identification data may be stored in a hardwired form such as by a set of dip switches.

The EPROM 150 is coupled to a microprocessor 152. The microprocessor 152 in the preferred embodiment is a Motorola HC6811 model microprocessor but any suitable microprocessor or microcontroller may be used. The microprocessor 152 is coupled to a clock circuit 154. Each of the note pads 118–134 is coupled to a series of force-sensing resistors 158, 160, 162, 164, 166, 168, 170, 172 and 174. The force-sensing resistors 158–174 are coupled to the inputs of an analog to digital converter 176. Another input of the analog to digital converter 176 is coupled to the special effect pad 136 via a force sensing resistor 178. The outputs of the analog to digital converter 176 are coupled to the microprocessor 152.

The positive and ground terminals 142 and 144 provide power from the booth computer 76 for the electrical components on the circuit board 148. The MIDI output terminal 146 is coupled to the microprocessor 152. In operation, the nine note pads 118–134, when depressed, change the voltage across the resistors 158–174. The electrical signals from the resistors 158–174 are converted by the analog to digital converter into a digital signal. The digital signal is then read by the microprocessor 152 which converts the digital signal into a MIDI signal which represents a sound similar to that produced by an instrument.

In the preferred embodiment, each of the nine note pads 118–134 represents a different note on a diatonic scale. Since the instrument box 50 represents a drum, the MIDI signal will represent drum sounds corresponding to notes on a diatonic scale. However, the booth computer 76 may interpret the MIDI signal as notes on different scales such as a pentatonic scale. Other instrument sounds may also be output by the booth computer 76. The different sounds may be used in conjunction with different lesson programs run using the booth computer 76.

The special effect pad 136 is a special pad which changes the MIDI data. For example, in the drum-shaped control box 50 shown in FIGS. 5A–5C, the special effect pad 136 dampens notes and stops the sounds from resonating from the note pads 118–134. This signal is relayed through the analog to digital converter 176 to the microprocessor 152 which makes appropriate modifications, according to the software in EPROM 150, to the output MIDI signal. The MIDI signal is output by the microprocessor 152 over the MIDI terminal 146.

Figure 7A:
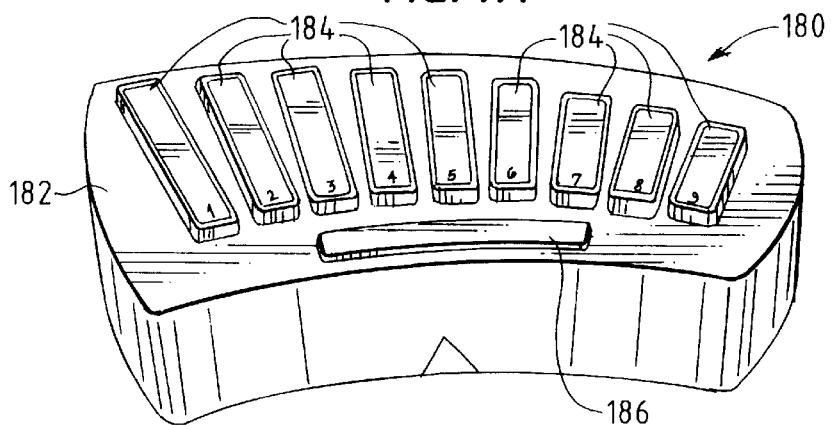
FIGS. 7A–7C are perspective views of other types of instrument control boxes.
Figure 7B:
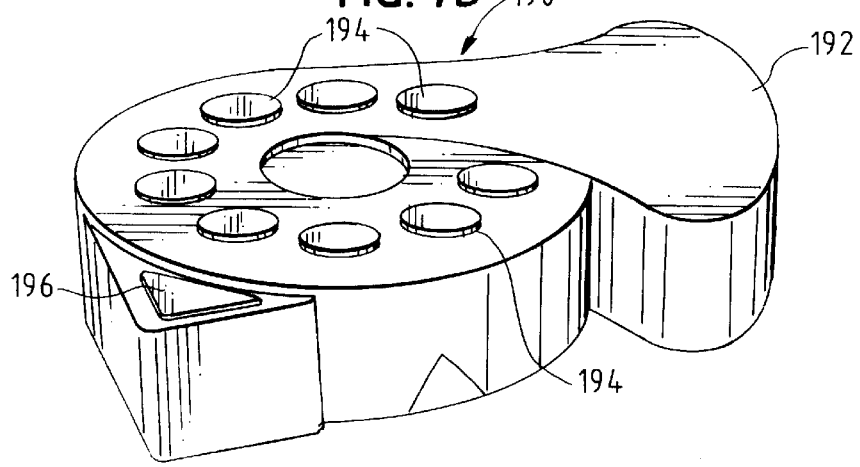
Figure 7C:
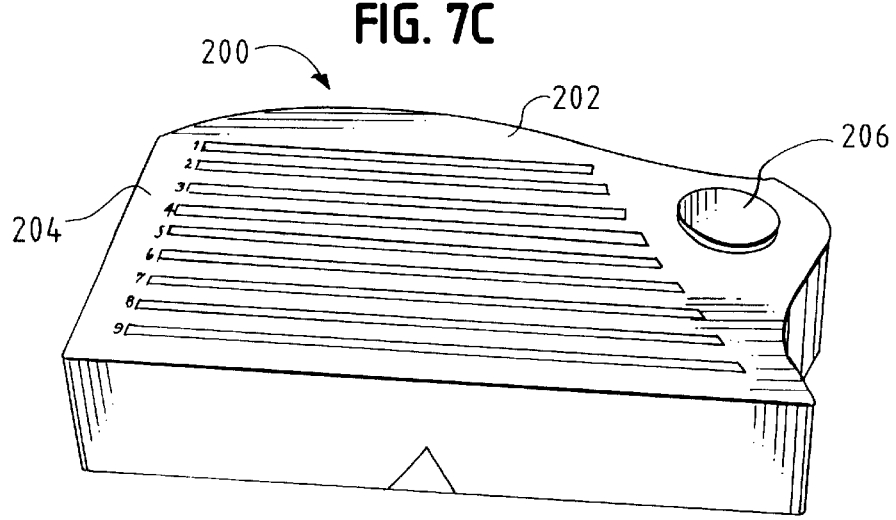

FIGS. 7A–7C show three other types of control boxes in different instrument shapes. Each of the boxes such as the control boxes shown in FIGS. 5A–5C or FIGS. 7A–7C may be used by a student in conjunction with any of the booths of the stations 32–40 in FIG. 1. The control boxes are different in shape, but each has an aperture and socket identical to the aperture 138 and socket 140 on the control box 50 shown in FIGS. 5A and 5C. The software in the booths is programmed so the boxes generate different sounds.

FIG. 7A shows a control box 180 in the shape of a block instrument. The control box 180 has a top surface 182 with nine note pads 184 and a special effect pad 186. The software in the booths may be programmed to generate a vibraphone sound corresponding to different musical notes. The special effect pad 186 creates a dampening effect on the notes played.

Similarly, FIG. 7B shows a control box 190 in the shape of a horn. The horn control box 190 has a top surface 192 with nine note pads 194 and a special effect pad 196. The software in the booths may be programmed to generate any woodwind or brass sound such as a clarinet sound corresponding to different musical notes. The special effect pad 196 creates a volume effect similar to supplying air to a woodwind on the notes generated by depressing the note pads 194.

Finally, FIG. 7C shows a control box 200 in the shape of a stringed instrument. The strings control box 200 has a top surface 202 with nine note pads 204 and a special effect pad 206. The software in the booths may be programmed to generate a stringed sound corresponding to different musical notes. The special effect pad 206 creates a dampening effect of the string notes. Of course different boxes representing different instruments other than those in FIGS. 5A–5C and 7A–7C may be used. Additionally, different input devices may be used.

Figure 8:
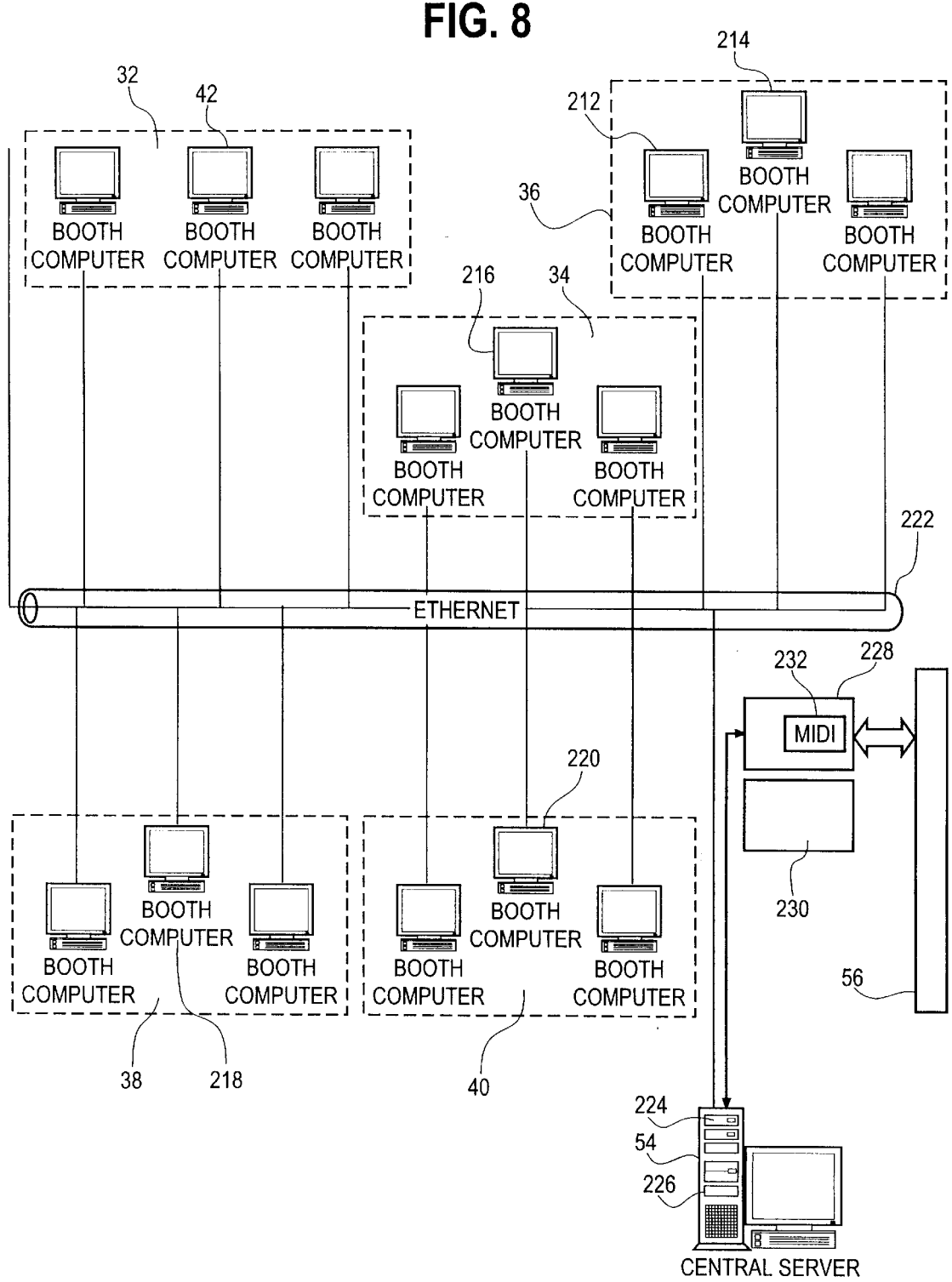
FIG. 8 is a block diagram of the components of the learning facility system according to the present invention.

FIG. 8 is a block diagram of the various components of the learning facility 30. Each station 32–40 has a series of booths, each with a booth computer such as computers 212, 214, 216, 218 and 220 which are similar to booth computer 76. The booth computers 76 and 212–220 are coupled to the central server computer 54 via a network bus 222. The network bus 222 is an Ethernet network which is coupled to Ethernet cards (not shown) attached to the computers 212–220. The computers 212–220 all have unique Ethernet addresses to communicate data, such as MIDI data, to the central server 54. Of course other network types such as token ring or Fast Ethernet may be used if desired.

The central server 54 has a permanent memory such as a hard drive 224 which holds a database file 226, which stores data relating to each control box in the learning facility 30. Typically, there are equal numbers of each of the four types of control boxes shown in FIGS. 5A–5C and 7A–7C available in the learning facility 30. The total number of control boxes for the learning facility 30 allow a limited number of students to visit the booths of the stations 32–40 in order to allow each student access to the stations 32–40 without waiting.

The database file 226 in the central server 54 has a separate record for each control box. The data in the record is obtained from data input by students on visiting and operating the various booths of the stations 32–40. The database record includes a permanent field which has unique identification data for the associated box. The database record stores a character string which is a name entered by the student as will be explained below. The database record also maintains the sessions and themes which have been completed by the student as well as the number of booths total which have been completed.

An orchestra wall computer 228 is coupled to the central server 54 via a serial connection. The orchestra wall computer 228 has a hard drive 230 which stores a prearranged musical theme composition in MIDI format. The hard drive 230 also has sufficient room to store the database 226 from the central server 54. In the preferred embodiment, the wall computer 228 is a digital recording system with MIDI capability such as an EMU Darwin model digital recording system. Alternatively, the orchestra wall computer 228 may be a normal computer with a MIDI controller which allows the computer 228 to play a composition using stored MIDI data from the central server 54 combined with the musical theme composition stored in the hard drive 230.

Figure 9:
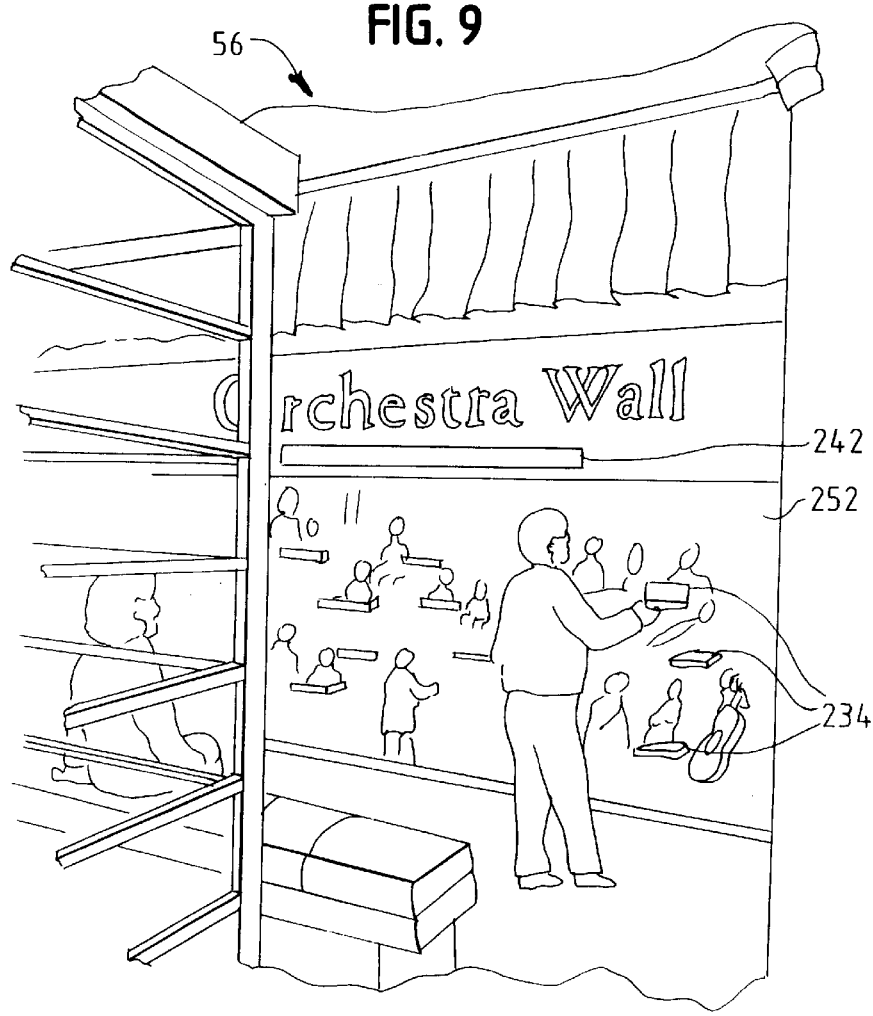
FIG. 9 is a perspective view of the orchestra wall according to the present invention.

FIG. 9 is a perspective view of the orchestra wall 56. The orchestra wall 56 allows up to fifteen students to play brief musical compositions which they composed using their control boxes at the booths. The orchestra wall 56 has a number of control box shelves 234 mounted on a wall section 236. The wall section 236 may have a graphical representation of an orchestra, with the box shelves 234 being located near or on images of individual musicians. The orchestra wall 56 has a large display 242 mounted over the wall section 236. The large display 242 is an LED display in the preferred embodiment. The large display 242 is controlled by the orchestra wall computer 228 and broadcasts messages of general interest to the students.

Figure 10:
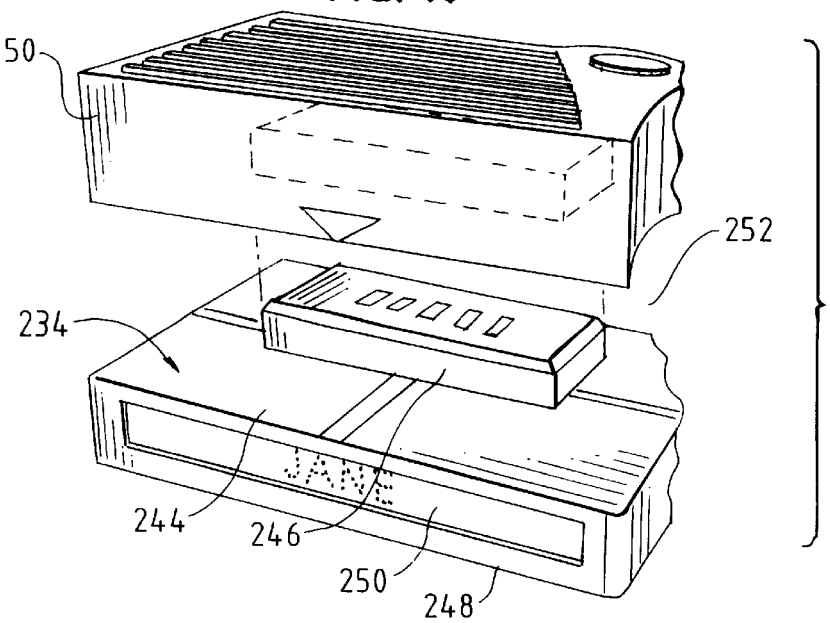
FIG. 10 is a close-up view of a shelf of the orchestra wall of FIG. 9 and an instrument control box.

FIG. 10 shows a perspective view of the control box 50 installed on a box shelf 234. The box shelf 234 has a top surface 244 with a coupler shoe 246. The coupler shoe 246 is similar to the coupler shoe 72 on the booths such as booth 42 shown in FIGS. 2 and 3. A front wall 248 has a display 250 which shows information, such as student's name, associated with each control box 50. In the preferred embodiment, the display 250 is an eleven-character LED display. Of course other types of displays such as a video screen may be used.

When the orchestra wall 56 has a sufficient number of control boxes 50 mounted on the box shelves 234, the database 226 is copied from the central server 54 to the hard drive 230 of the wall computer 228. The transfer of a copy of the database 226 to the wall computer 228 allows the entries of the database 226 on the central server 54 to be erased and reused while the wall computer 228 is in use.

Data such as MIDI data and identification data is taken from the database file 226 stored on the central computer 54 and transmitted to the wall computer 228. The identification data for the student is displayed on the LED displays 250. As will be explained, in the preferred embodiment, the student can enter up to an eleven character name which is stored in the database 226 of the central computer 54 and displayed on the display 250 when the control box 50 is connected to the box shelf 234. The MIDI data for each control box 50 connected to the box shelves 234 is loaded with the prearranged theme composition on the hard drive 230, and the combined composition may be played from a series of speakers 252.

The operation of the booths will now be explained with reference to FIGS. 3, 4 and 8 in conjunction with FIGS. 11A–11C which are a flow diagram of the booth operation software in the central server 54. The central server 54 has several user-operated programs which are used to track students' progress through the booths. One program allows all of the computers in the learning facility 30 to be reset. Additionally, another program allows all the records of the database 226 to be erased. The central server 54 is operated by employees of the facility 30.

Each visiting student is instructed to select one of the four types of control boxes shown in FIGS. 5A–5C and 7A–7C. The employee places the chosen control box on an initialization shoe (not shown) which is coupled to the central computer 54. The central computer 54 reads the identification data on the control box and erases the data fields in the database record associated with the control box. The employee then gives the control box to the student.

Figure 11A:
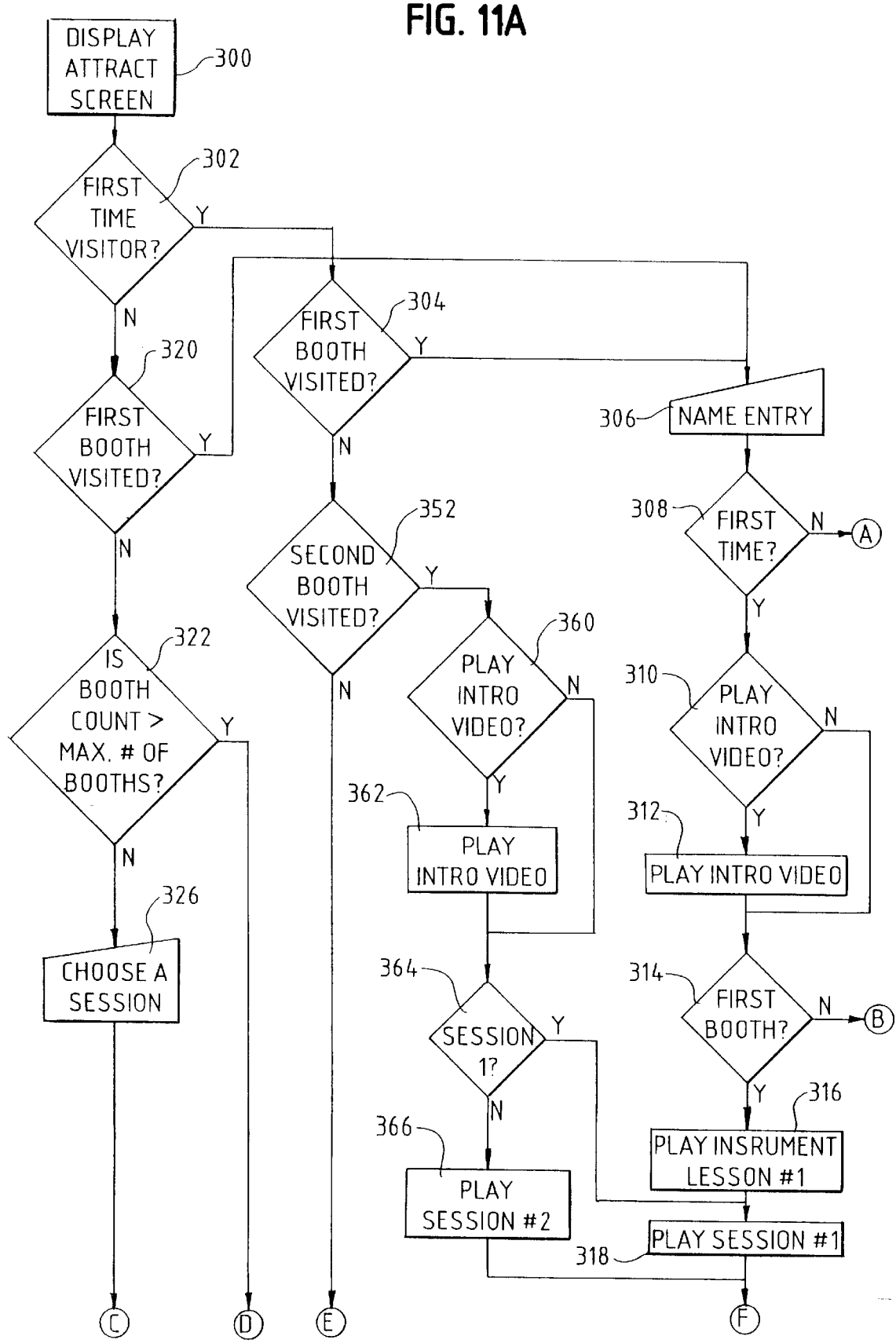
FIGS. 11A–11C are the flow diagram of the operating program routine according to the present invention.
Figure 11B:
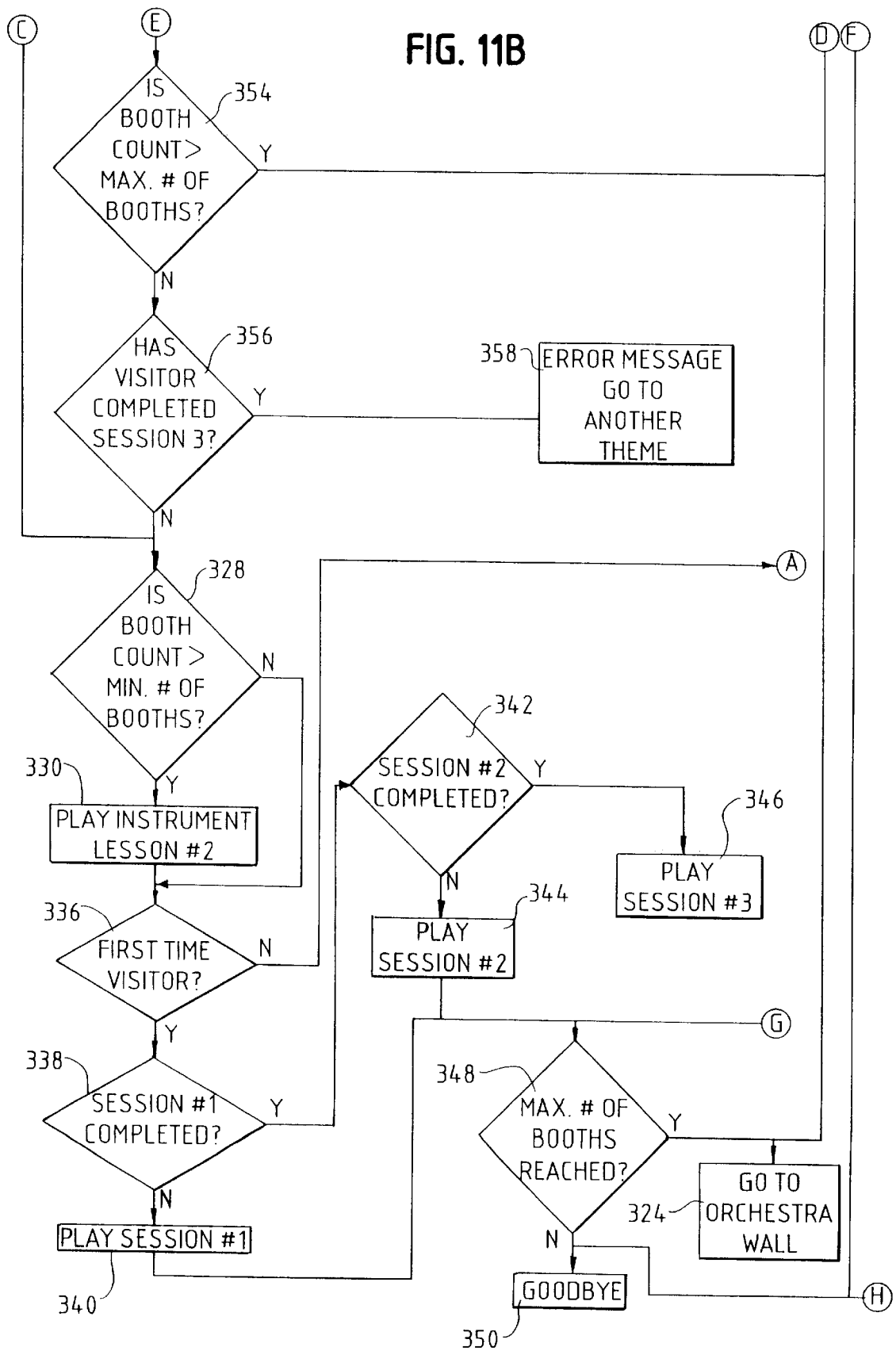
Figure 11C:
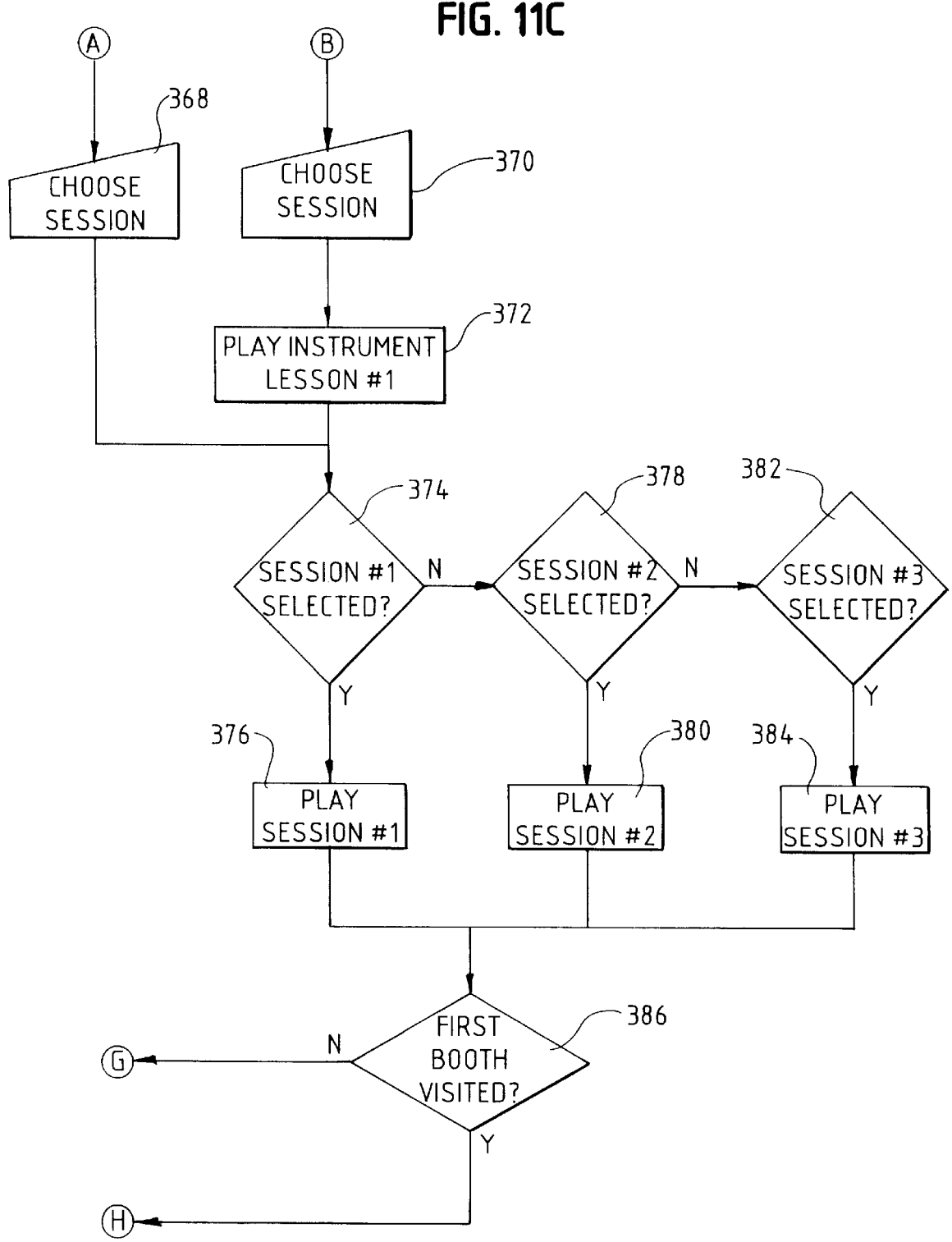
Figure 12:
FIG. 12 is a screen print of the initial attract display of the operating program routine.

With reference to FIGS. 11A–11C in particular, the first time a control box such as the control box 50 is connected to the coupler shoe 72 in a booth such as booth 42, the general operation software is activated by a signal sent by the booth computer 76 to the central server computer 54. The software begins with step 300 which shows an initial display graphic on the display 84. FIG. 12 is a screen print of an initial display graphic shown in all of the booths.

Returning to FIG. 11, after the student places the box 50 in the coupler shoe 72 of the booth 42, the identification data of the control box 50 is transmitted to the central server 54. The booth computer 76 then displays a screen asking whether the student is a first-time visitor to the learning facility in step 302. If the student answers yes, the program proceeds to step 304 where the server computer 54 checks the database record relating to the control box 50 in the database 226 to determine whether the control box 50 has been previously used in any booth. If the control box 50 has not been used at any booth, the display screen 84 will display an alphabetical keypad on touch screen 84 and a graphic requesting the student to enter a name in step 306. The student's name will now be displayed on following screens shown in other booths where the control box 50 is connected. The student's name is also stored in the database record associated with the box 50 by the central server 54.

The program then proceeds to step 308 where it determines whether the student is a first time visitor to the learning facility 30 from the information supplied in step 302. If the student is a first time visitor, the booth computer 76 displays a graphic asking whether the student wishes to view an introductory video in step 310. If the student responds yes, the booth computer 76 loads and plays an introductory video stored in hard drive 94 on the display screen 84 in step 312. The introductory video explains the operation of the booths and stations in the learning facility 30. The introductory video played in step 312 is a movie file stored on the hard drive 94 and may include sound, video or other multi-media data.

After the introductory video is played in step 312 or if the student does not choose to view the introductory video in step 310, the program proceeds to step 314 where it determines whether the booth 76 is the first booth visited by the student. The central server 54 performs this check by examining the database record affiliated with the control box 50.

If the central server 54 determines that the student has not visited any other booths in step 314, the program proceeds to run a first instrument lesson in step 316. The first instrument lesson is a program which is loaded from the hard drive 94 of the booth computer 76 for student interaction. FIGS. 13A–13E are a series of screen prints which are displayed in the course of the first instrument lesson. The first instrument lesson program determines which type of control box 50 is connected to the booth computer 76. The instrument lesson program then selects the appropriate music lesson for the type of control box 50. The music lesson differs depending on the type of control box 50 which is determined by the central server 54.

Figure 13A:
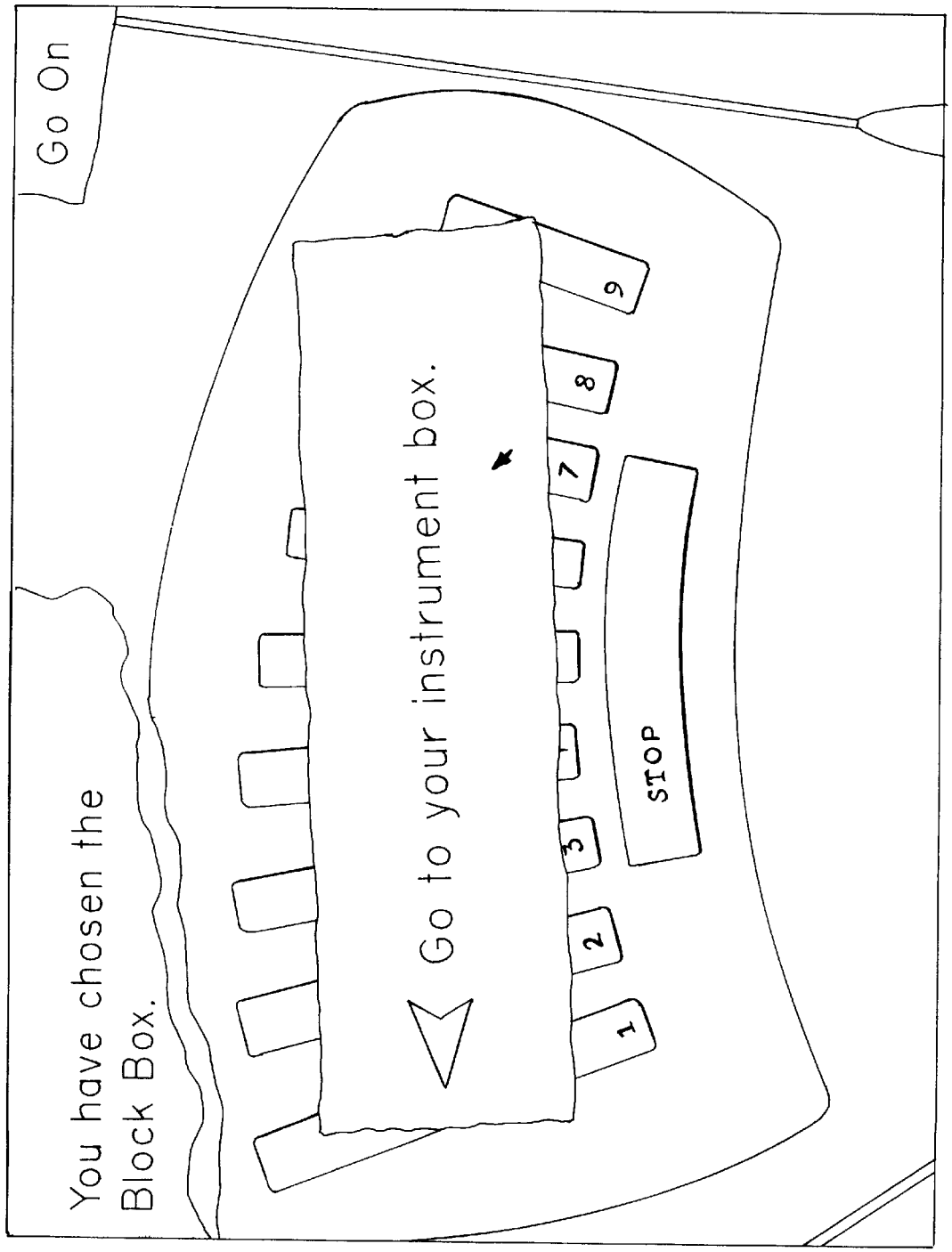
FIGS. 13A–13E are a series of screen prints for the first instrument lesson program segment.
Figure 13B:
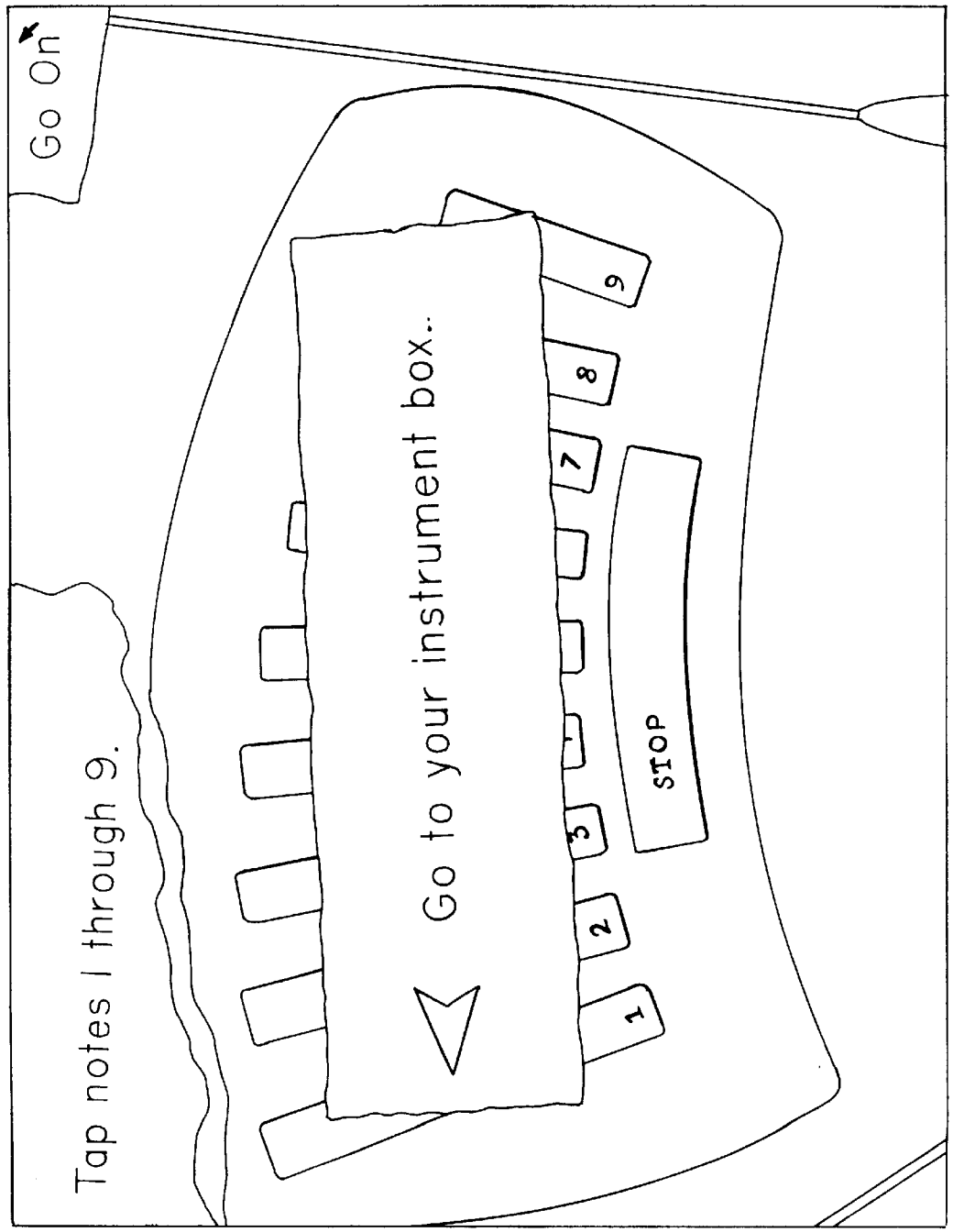
Figure 13C:
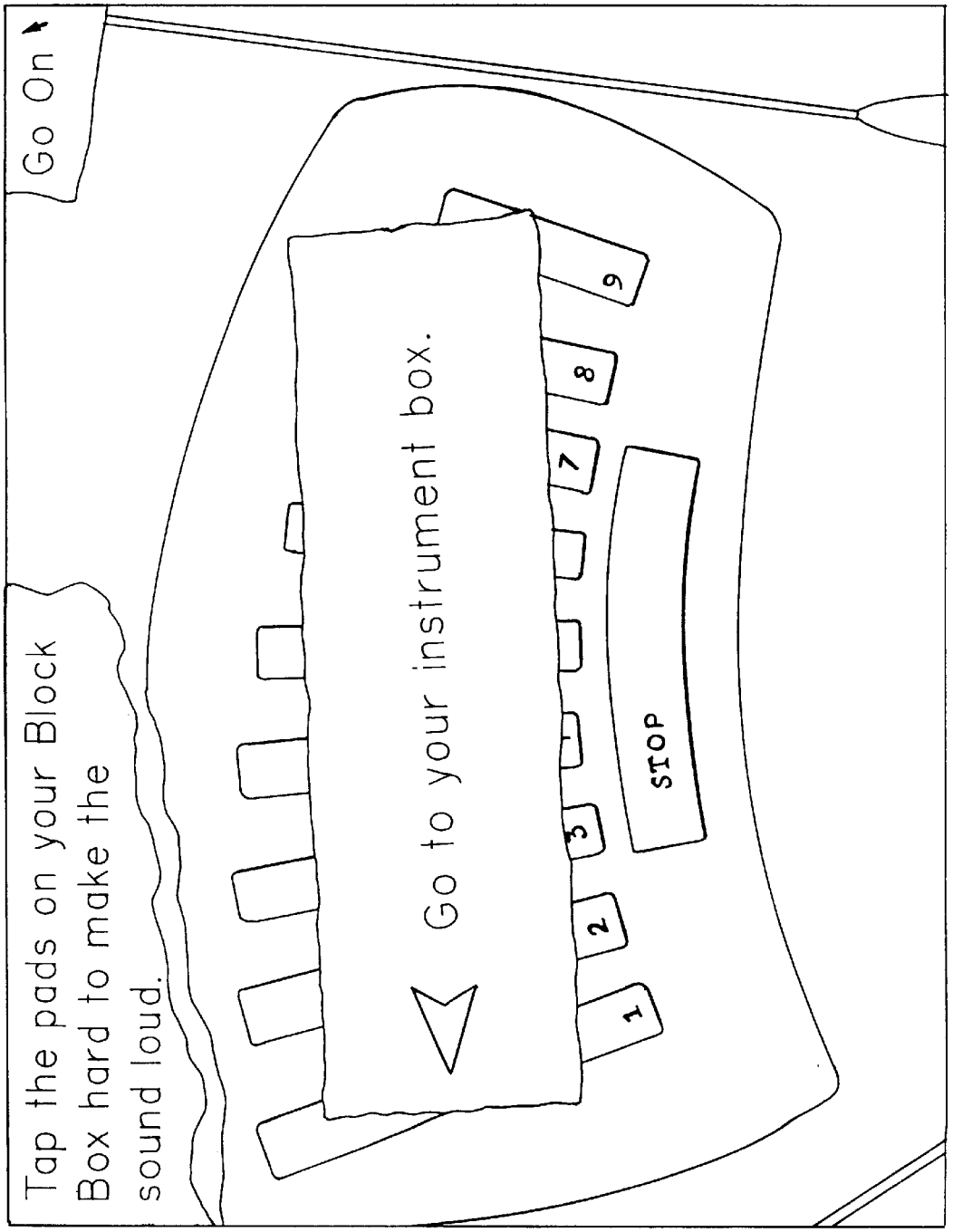

The instrument lesson explains the particular instrument represented by the control box 50 as shown in the screen print shown in FIG. 13A. In each of the proceeding instructional steps, the computer 76 will display instructional graphics on the display 84. The graphics are coordinated with student activation of the note pads 118–134 on the control box 50 in response to the instructions on the display 84. The instrument lesson program instructs the user to activate the box 50 by playing the note keys 118–134 on the box 50. The lesson then instructs the student that pressing on the note keys in order represent playing notes in ascending order in the screen display shown in FIG. 13B. The lesson then instructs the student that the pressure placed on each of the note keys 118–134 determines the loudness or softness of the note played in the screen display shown in FIG. 13C.

Figure 13D:
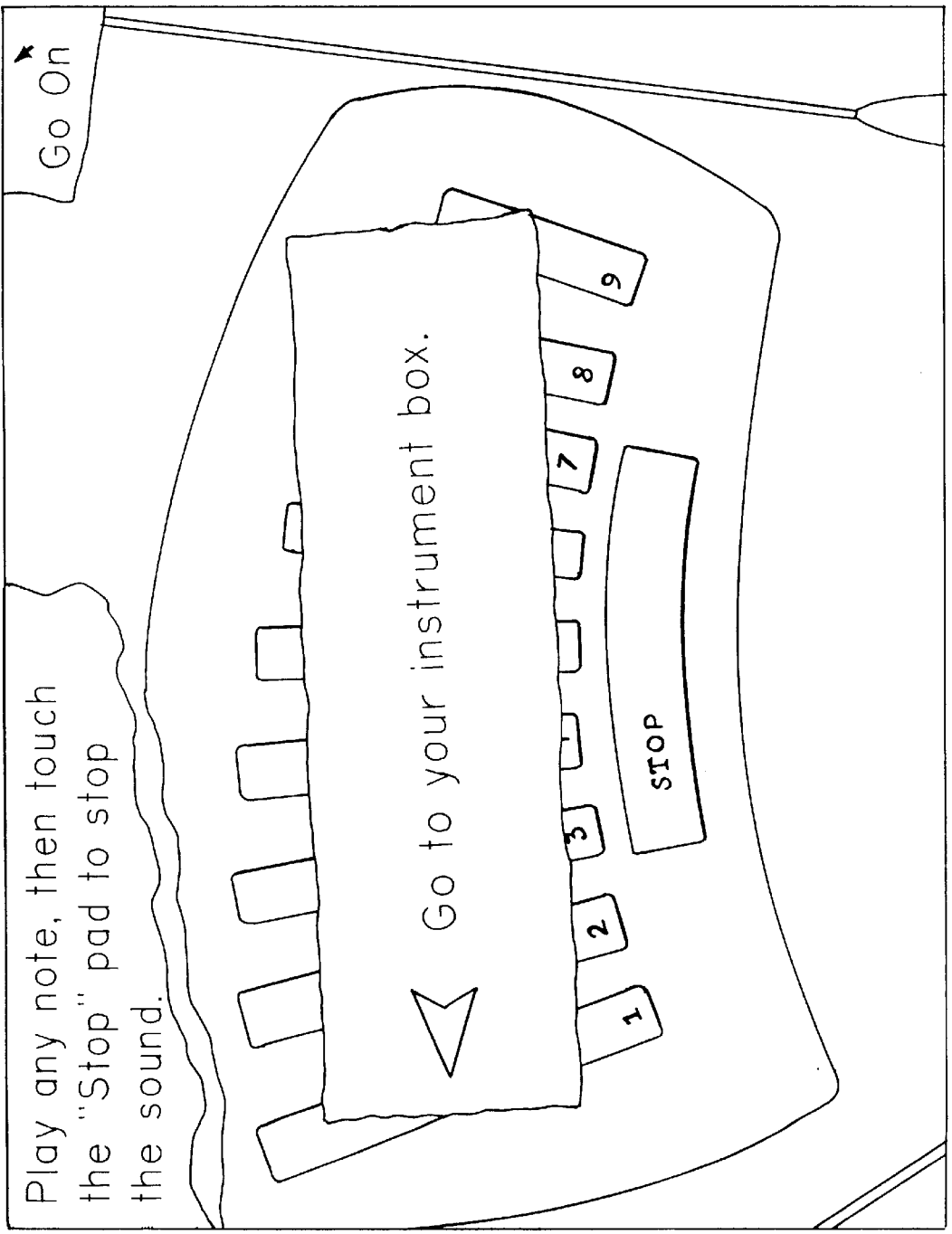
Figure 13E:
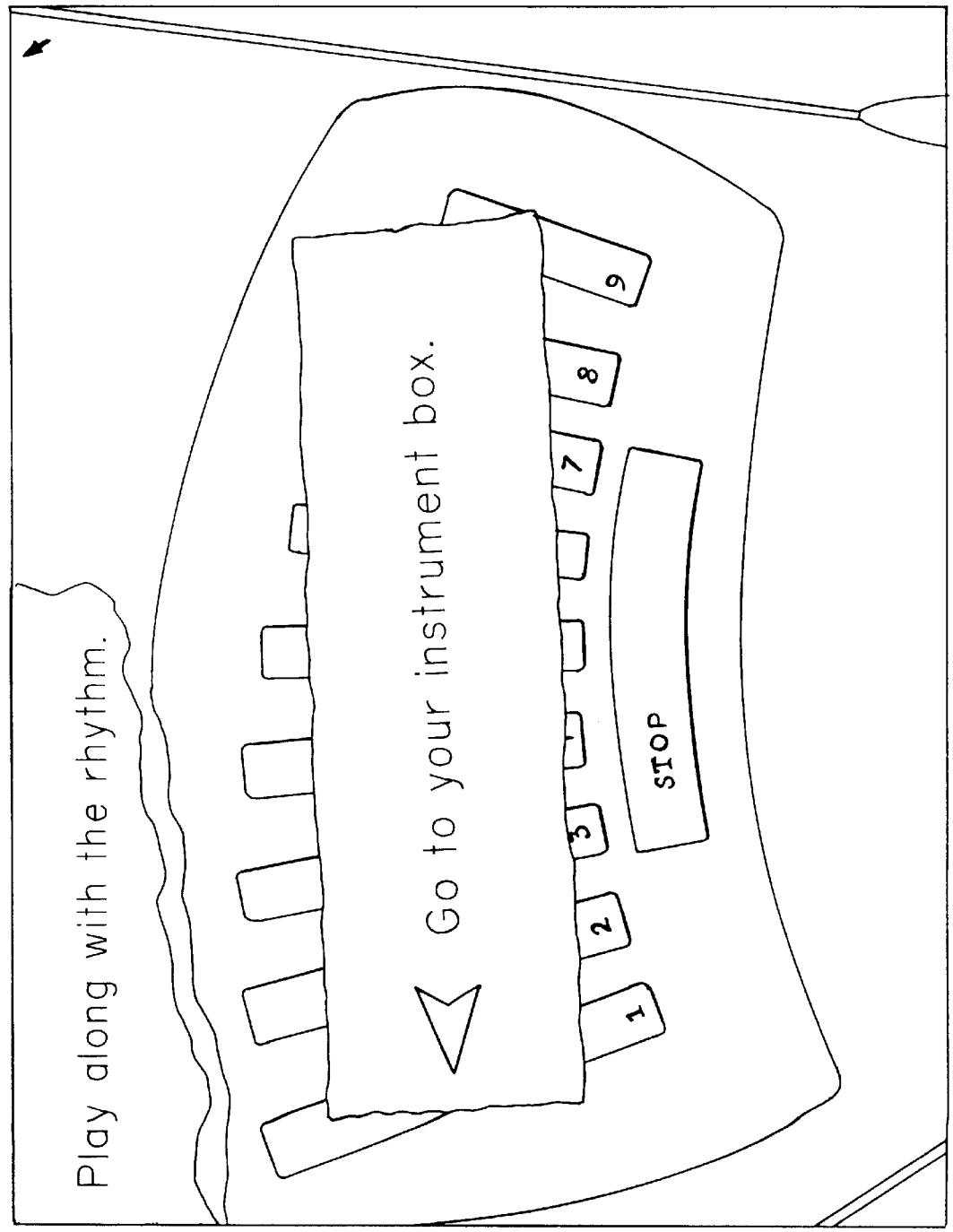

The next screen shown in FIG. 13D instructs the student on the use of the special effect key 136. Finally, the instrument lesson program instructs the student to improvise a musical composition by playing the note keys 118–134 by displaying the screen in FIG. 13E. The musical composition in the preferred embodiment is an improvisation over a short 5-bar tom-tom vamp. The vamp is equivalent to the prearranged theme composition stored on the hard drive 230 of the orchestra wall computer 228. The student's improvised composition is stored as MIDI data in the database record of the control box 50 in the central server 54.

Returning to FIG. 11, after running the first instrument lesson program in step 316, the program runs the first session program of the theme of the booth 42 in step 316. The first session program is loaded from the hard drive 94 of the booth computer 76 in step 318. When the first session program is loaded, the booth computer 76 communicates an acknowledgment signal to the server computer 54. The server computer 54 then makes an entry in the database record indicating that the control box 50 has finished the session. After the program for the first session finishes in step 318, the program proceeds to step 350.

If the student indicates that he or she have visited the learning facility 30 previously in step 302, the server computer 54 determines whether the student has visited any booths in step 320 by reading the database record associated with the control box 50. If the control box 50 has not been used on at least one booth, the program proceeds to step 306 and requests the student to enter his or her name.

If the student has already completed a session in step 320, the program will proceed to step 322 to read the database record relating to the control box 50 to determine the number of booths visited by the student.

If the database record indicates that the number of booths visited is greater than the maximum number of booths allowed in step 322, the program will display a graphic asking the student to proceed to the orchestra wall 56 in step 324. In the preferred embodiment, the maximum number of booths which may be visited by a student is eight. However, this number may be adjusted depending on the number of themes and lessons in those themes. Alternatively, the maximum number may be set by an employee and stored in the central server 54.

If the database record indicates that the number of booths visited is equal to or less than the maximum number of booths in step 322, the program will display a screen in step 326 requesting the user to choose one of the three sessions within the theme relating to the booth 32.

Figure 14:
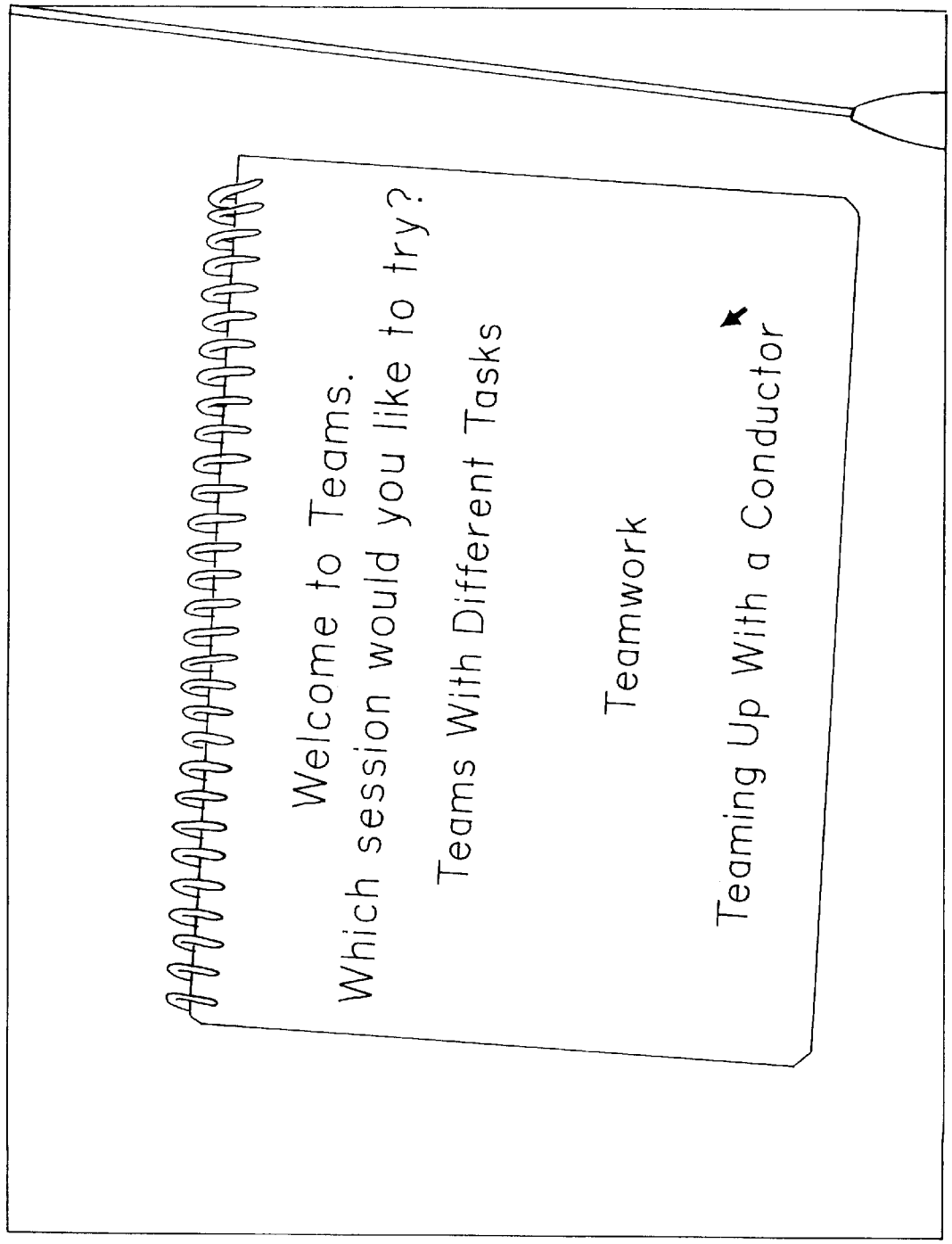
FIG. 14 is a graphic displayed to allow a student to select different session themes.

For example, the screen displayed in the preferred embodiment in step 326 is shown in FIG. 14 and may include a brief text and graphical description of each of the three sessions. In the example of the theme of Teams for booth 42, these sessions include instruction regarding: 1) "music in a group"; 2) "fitting in on a team" and 3) "a conductor." The sessions do not have to be played in sequence.

Returning to FIG. 11, the program then proceeds to step 328 where it determines whether the number of booths visited is equivalent to one less than the minimum number of booths which is four in the preferred embodiment. The minimum number of booths may be set by an employee using the central server 54 in accordance with different numbers of stations and lessons. If the booth count is equivalent to one less than the minimum number of booths, the program proceeds to step 330 where the booth computer 76 loads a program relating to a second instrument lesson. The second instrument lesson in step 330 is thus activated when the minimum number of booths is reached sufficient to allow minimum competency at the orchestra wall 56.

FIGS. 15A–15E are a series of screen prints of the graphics which are displayed on the display 84 from the second instrument lesson program. The second instrument lesson is similar to the first instrument lesson in that there are four different versions of each type of control box. The program determines which version of the second instrument program to load. The student is then instructed to alternate playing the first and last note pads on the control box 50 as shown in a display screen shown in FIG. 15A.

Figure 15A:
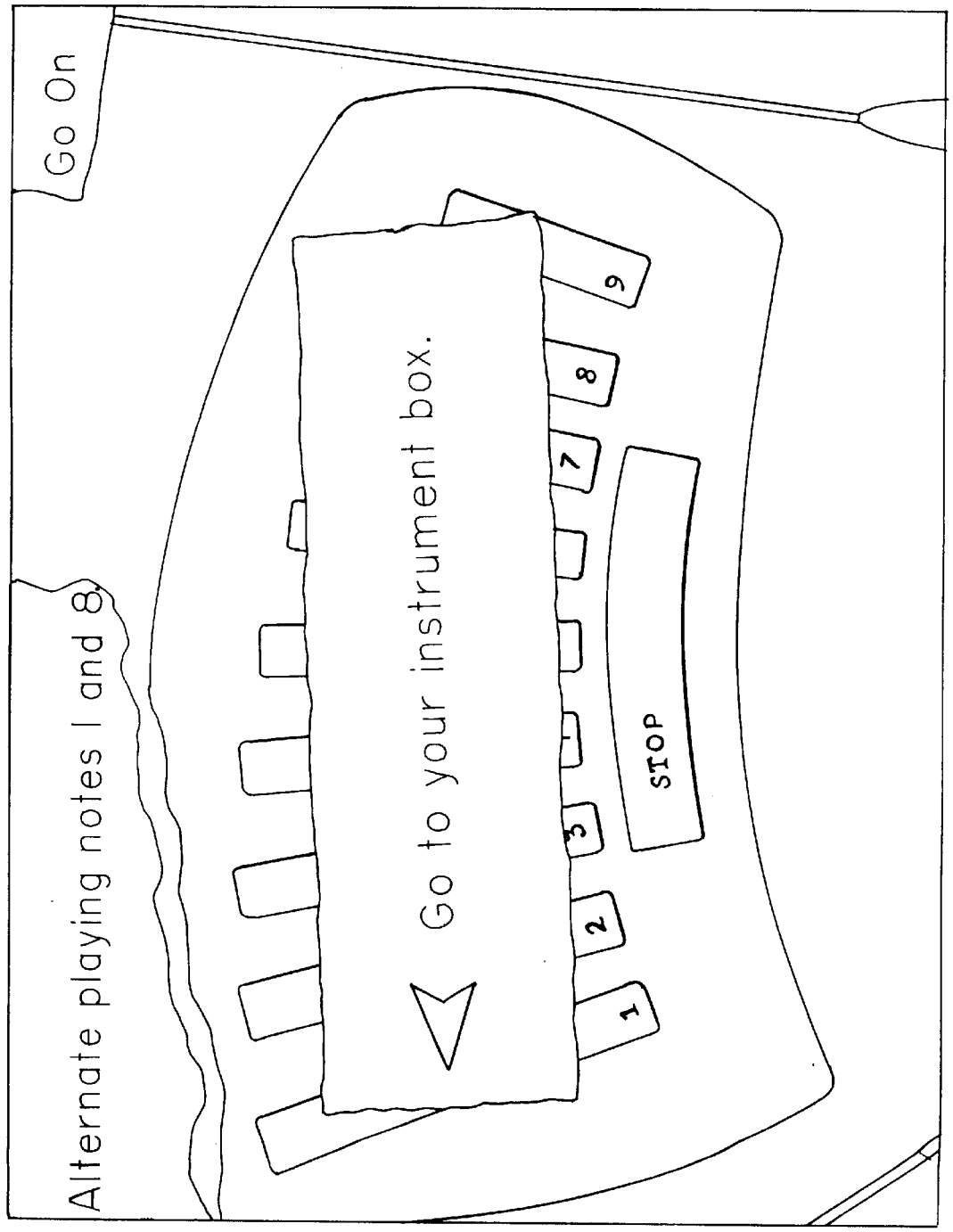
Figure 15B:
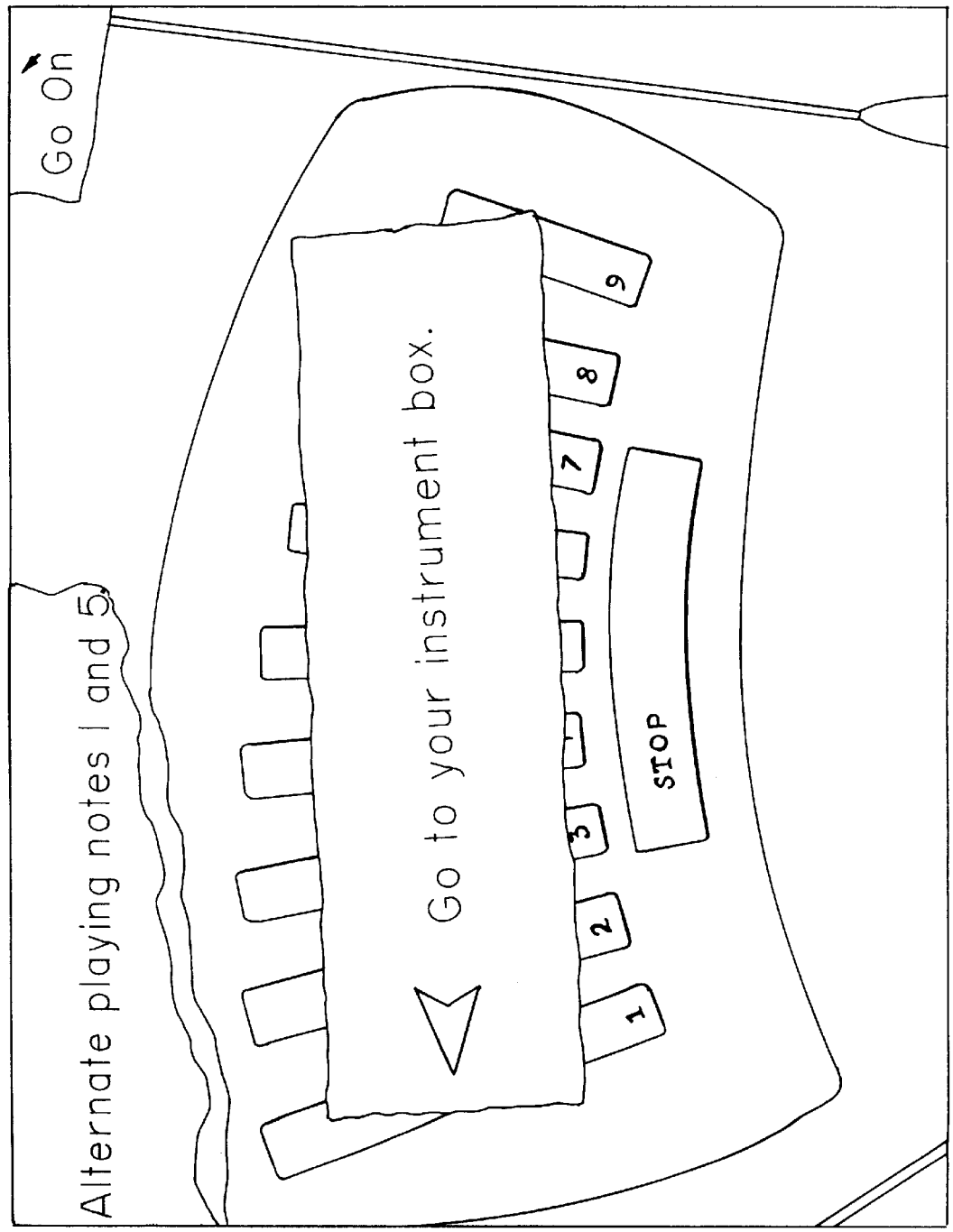
Figure 15C:
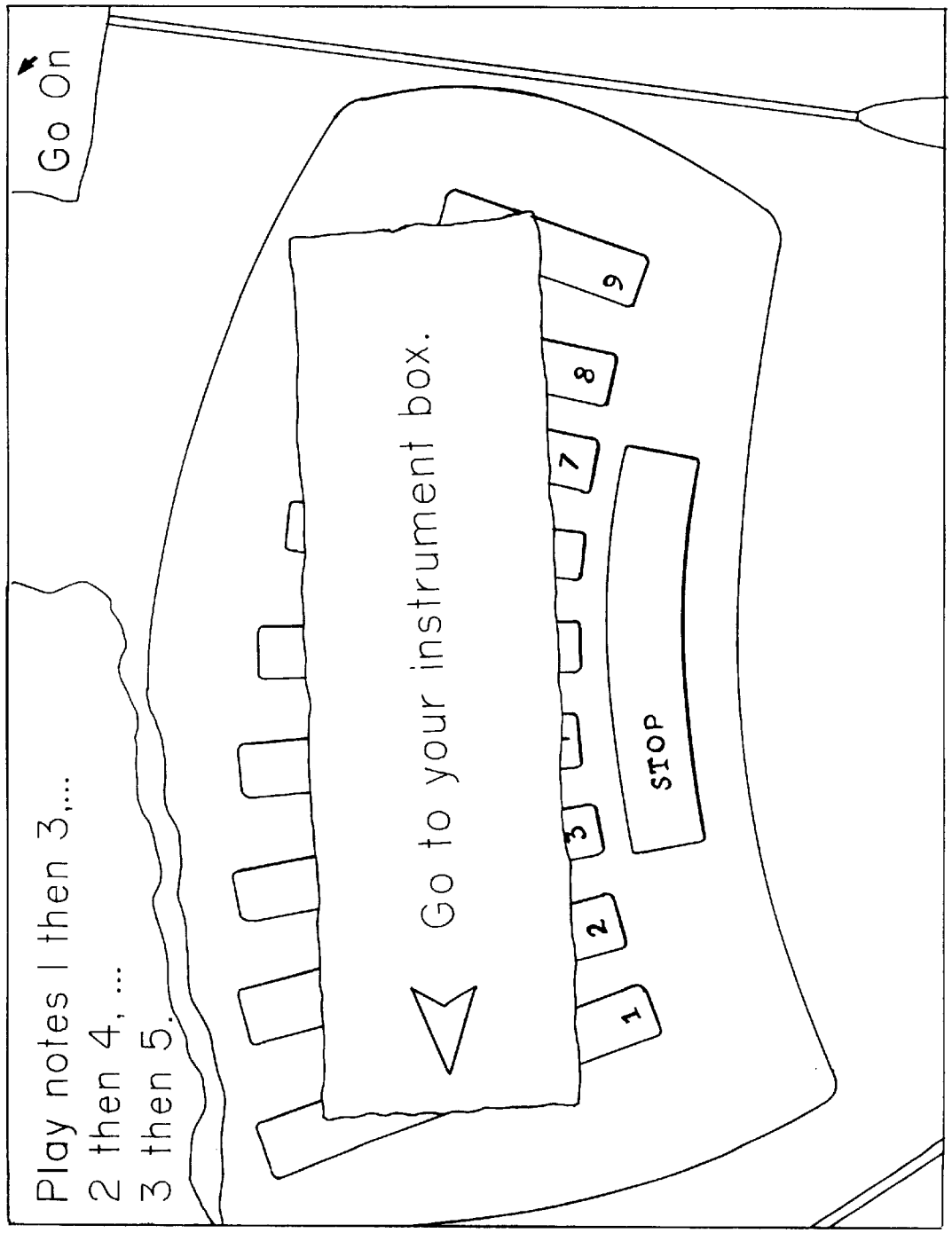
Figure 15D:
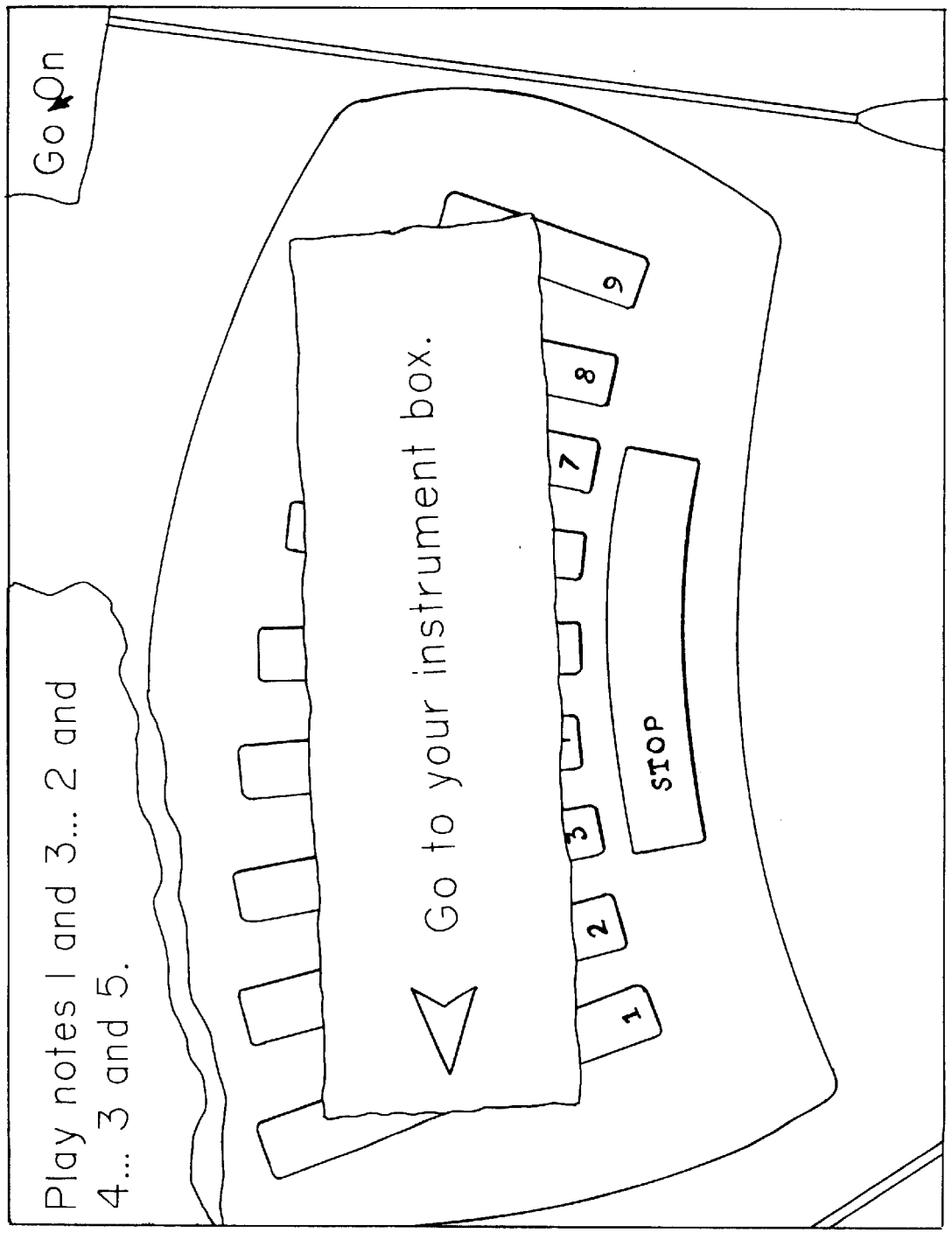

After the student has alternated playing the first and last note pad, the second instrument lesson program then instructs the student to alternate playing the first and fifth note pads as shown in FIG. 15B. The student is then instructed to alternate playing the first and third notes, the second and fourth notes and the third and fifth notes as shown in FIG. 15C. The student is then instructed to play the first and third note together and then the second and fourth notes together as shown in FIG. 15D. The purpose of these instructions is to teach playing different note progressions and playing notes in combination. Finally, the student is asked to play a composition along with a preprogrammed musical piece as shown in FIG. 15E. The composition is stored as a MIDI data file in the database record associated with the control box 50 in the central server 54.

After the second instrument lesson is run in step 330 or if the number of booths used by the control box 50 is between the minimum and maximum number of booths, the program then proceeds to step 336 to check whether the student indicated he or she was a first-time visitor in step 302. If the student indicated yes, the program proceeds to step 338 and checks the database record in the central server 54 to determine whether session one of the theme of station 42 has been completed. If session one has not been completed, the program proceeds to step 340 where the booth computer 76 loads a program for session one of the station theme.

If the user has completed session one, the program proceeds to step 342 to determine whether the user has completed session two. If the user has not completed session two in step 342, the program proceeds to step 344 where the booth computer 76 loads a program for session two of the station theme.

If the user has completed session two, the program proceeds to step 346 where the booth computer 76 loads a program for session three of the theme associated with the booth 42. After the sessions are completed in either steps 340, 344 or 346, the program increments the number of booths visited entry in the database record affiliated with the control box 50 in the central server 54. The program then checks whether the maximum number of booths has been reached in step 348.

If the maximum number of booths has been reached as determined in step 348, the program proceeds to step 324 in which the booth computer 76 displays a screen instructing the student to go to the orchestra wall 56. If the maximum number of booths has not been exceeded in step 348, the booth computer 76 will display a goodbye message to the user in step 350. The goodbye message is unique to the theme of the station such as the Teams theme of the station 32.

Returning to step 304, if the central server 54 determines that the booth 42 is not the first booth visited, the program checks whether the booth 42 is the second booth visited in step 352. If the program determines the booth 42 is not the second booth visited in step 352, the program proceeds to step 354 where it compares the booth count stored in the database record of the control box 50 with the maximum number of booths. If the booth count is greater than the maximum number of booths, the program will proceed to step 324 and instruct the student to proceed to the orchestra wall 56.

If the booth count is not greater than the maximum number of booths, the program will determine whether the student has completed the third session of the theme of the booth 42 in step 356. If the student has completed the third session of the theme, the program proceeds to step 358 where the booth computer 76 displays a graphic instructing the student that the theme has been completed and to go to another station. If the student has not completed the third session in step 356, the program proceeds to step 328 where it begins a sequence to determine whether to play the second instrument lesson as described above.

Returning to step 352, if the program determines that booth 42 is the second booth visited, it proceeds to step 360 which displays a screen requesting whether the student wishes to play the introductory video. If the student elects to play the introductory video in step 360, the program proceeds to load the introductory video and play it on computer 76 in step 362. The program then proceeds to step 364. The program will also proceed to step 364 if the student elects not to play the introductory video in step 360.

The program reads the database record associated with the control box 50 to determine whether session one has been completed in step 364. If session one has not been completed, the program proceeds to step 318 and plays the program for session one. After session one has been completed, the program updates the database record to indicate that session one of the theme has been completed.

If session one has already been completed, the program proceeds to step 366 and loads and plays the program for session two in computer 76. After playing the program for session two, the program updates the database record to indicate that session two of the theme has been completed. The program then proceeds to step 350 to display the goodbye screen.

Returning to steps 308 and 336, if the student indicates he or she is not a first-time visitor in these steps, the program proceeds to step 368 which requests the student to select one of the sessions of the theme. Additionally, if the program determines that booth 42 is not the first booth visited in step 314, the program will request that the student select one of the sessions of the theme in step 370. Both step 368 and step 370 display the graphic shown in FIG. 14. The program will then play the first instrument lesson program in step 372.

After completing either step 368 or step 372, the program determines whether the student selected session one in step 368 or step 370 in step 374. If session one was selected, the program proceeds to step 376 where the booth computer 76 loads the program for session one of the station theme.

If the user has not selected session one, the program proceeds to step 378 to determine whether the user has completed session two. If the user has selected session two in steps 368 or 370, the program proceeds to step 380 where the booth computer 76 loads the program for session two of the station theme.

If the user has not selected session two, the program proceeds to step 382 and determines if the user has selected session three in steps 368 or 370. The booth computer 76 loads the program for session three of the theme associated with the booth 42 in step 384. After the sessions are completed in either steps 376, 380 or 384 the program increments the number of booths visited entry in the database record affiliated with the control box 50.

The program then checks whether the booth 42 is the first booth visited in step 386. If the booth 42 is the first booth visited, the program proceeds to step 350 to display the goodbye screen. If the booth 42 is not the first booth visited, the program proceeds to step 348 to determine whether the maximum number of booths has been reached from the database record and hence whether the student should be directed to the orchestra wall 56.

By way of example, the theme for the particular booth 42 as shown in FIGS. 2 and 3 is Teams. The first session program is entitled "Music In A Group" the second program session is "Fitting In On A Team" and the third program session is "A Conductor." Of course, each session is different for each of the different themes. In this particular theme, the first session, "Music In A Group" teaches a student that it is desirable to form teams to achieve desired results such as in a symphony orchestra. The second session, "Fitting In On A Team," teaches a student the hierarchy of an ensemble such as a symphony orchestra. The third session, "The Conductor," teaches a student that a director who does not play an instrument controls the different instruments of the symphony orchestra.

Figure 16:
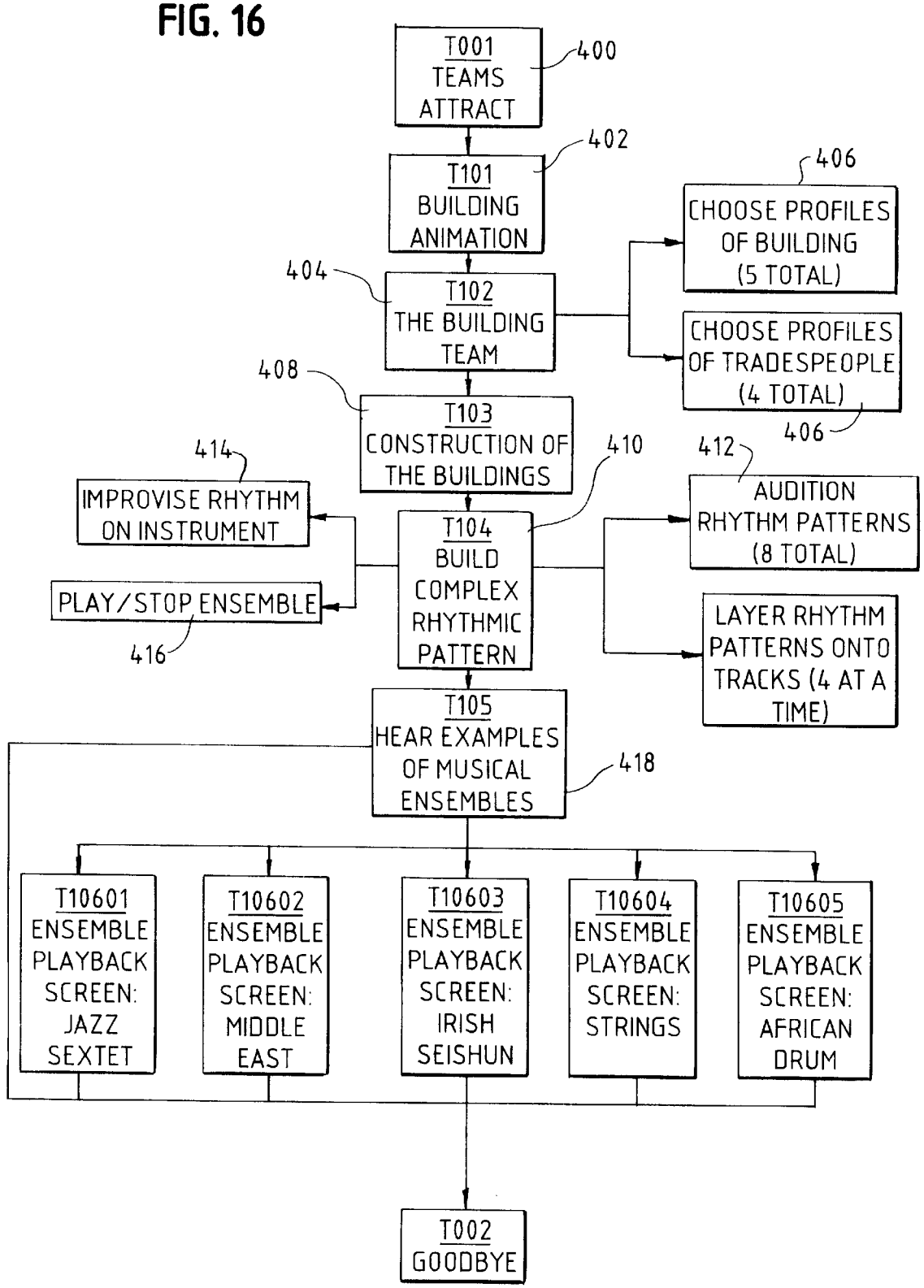
FIG. 16 is a flow diagram of the program for running the first session on the theme of Teams.

FIG. 16 is a flow diagram of a first session program in the theme of teams which is stored on the booth computer 76 of the station 42. The first session program is played in steps 318, 340 or 376 of the operating program in FIG. 11. The first session of the teams theme is directed toward playing music as a group. Before any of the sessions are selected the computer 76 displays an attract screen which contains graphics and sounds related to the general theme of teams in step 400 as previously shown in FIG. 12.

Figure 17A:
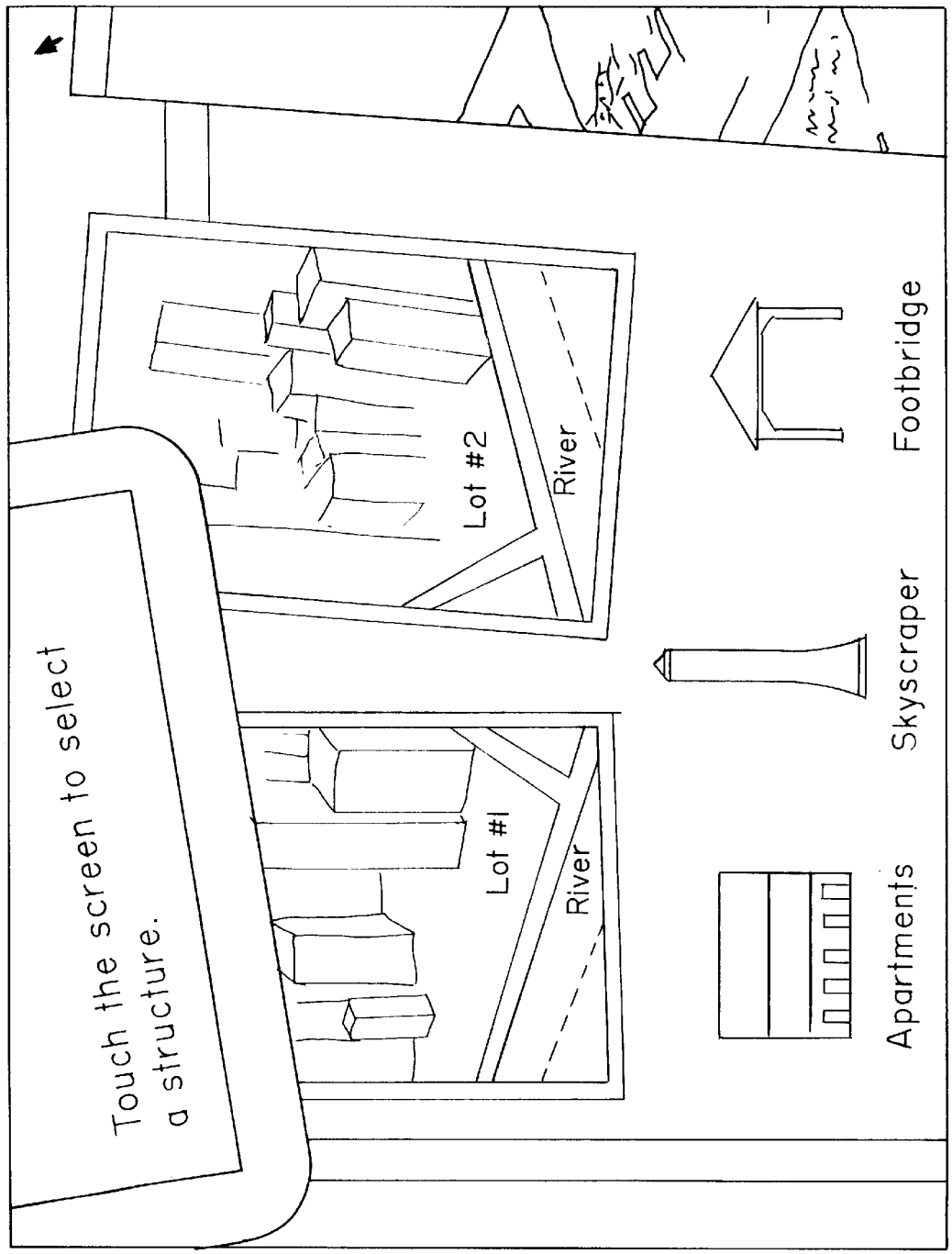
FIGS. 17A–17F are screen prints which are displayed in the first session of the Teams theme.

Returning to FIG. 16, once the first session is selected, a building animation movie is played in step 402. The building animation movie shows different characters putting together an elaborate building. After the building animation, a screen is displayed with two empty lots side by side in step 404. FIG. 17A shows the screen with the two empty lots.

Figure 17B:
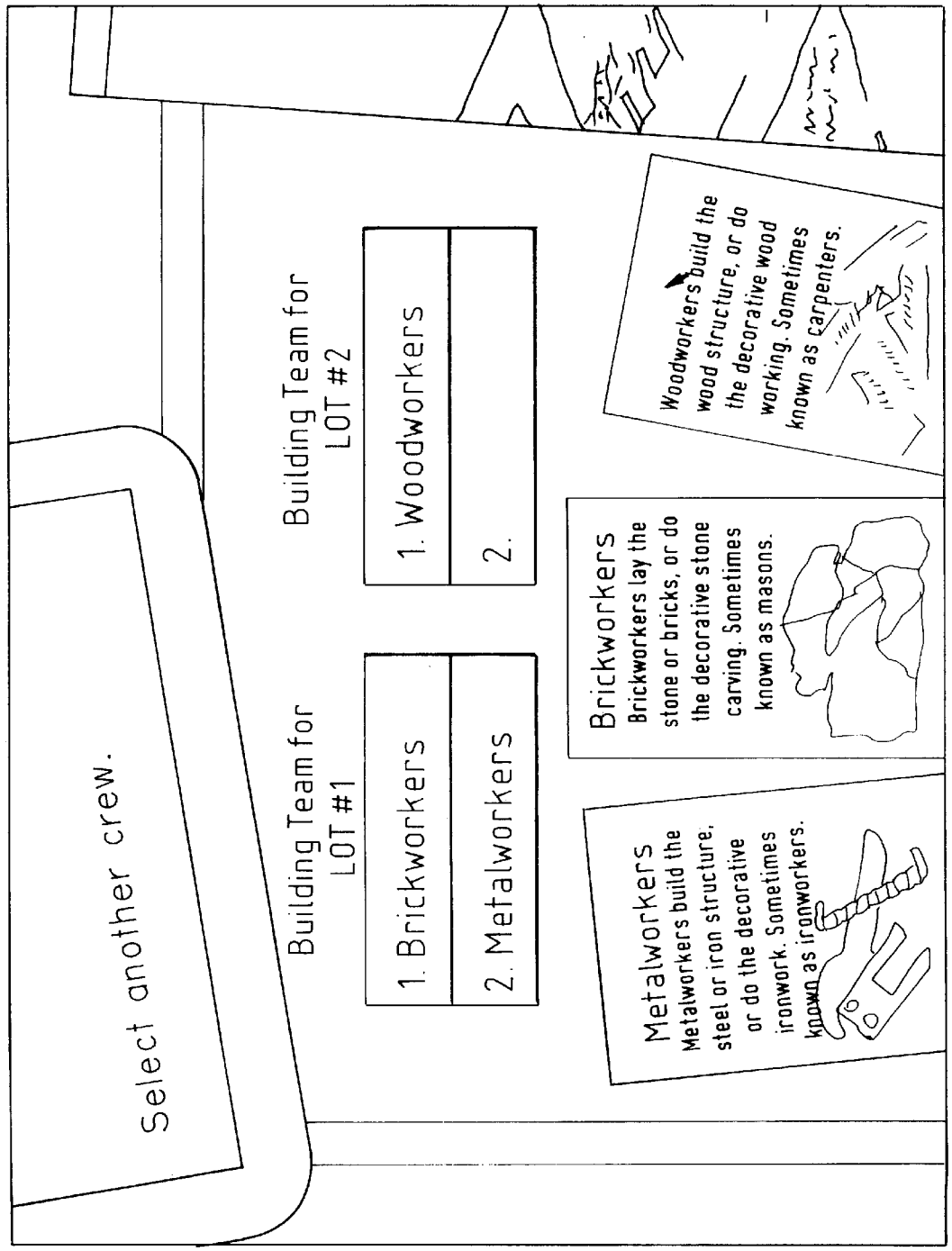

The student is then asked to choose between four building forms (i.e. apartment, skyscraper, dome or bridge) in step 406. The student is given specific criteria for each building. After selecting the building, the student is requested to put together two teams of tradespeople to build the same type of structure in the empty lots previously displayed in step 402. The student may elect to gather information on the different types of tradespeople available in step 406. This information is shown to a student in a display shown in FIG. 17B. The student has a certain duration to perform the instructions in steps 404 and 406 which is determined by the operator of the central server 54.

Figure 17C:
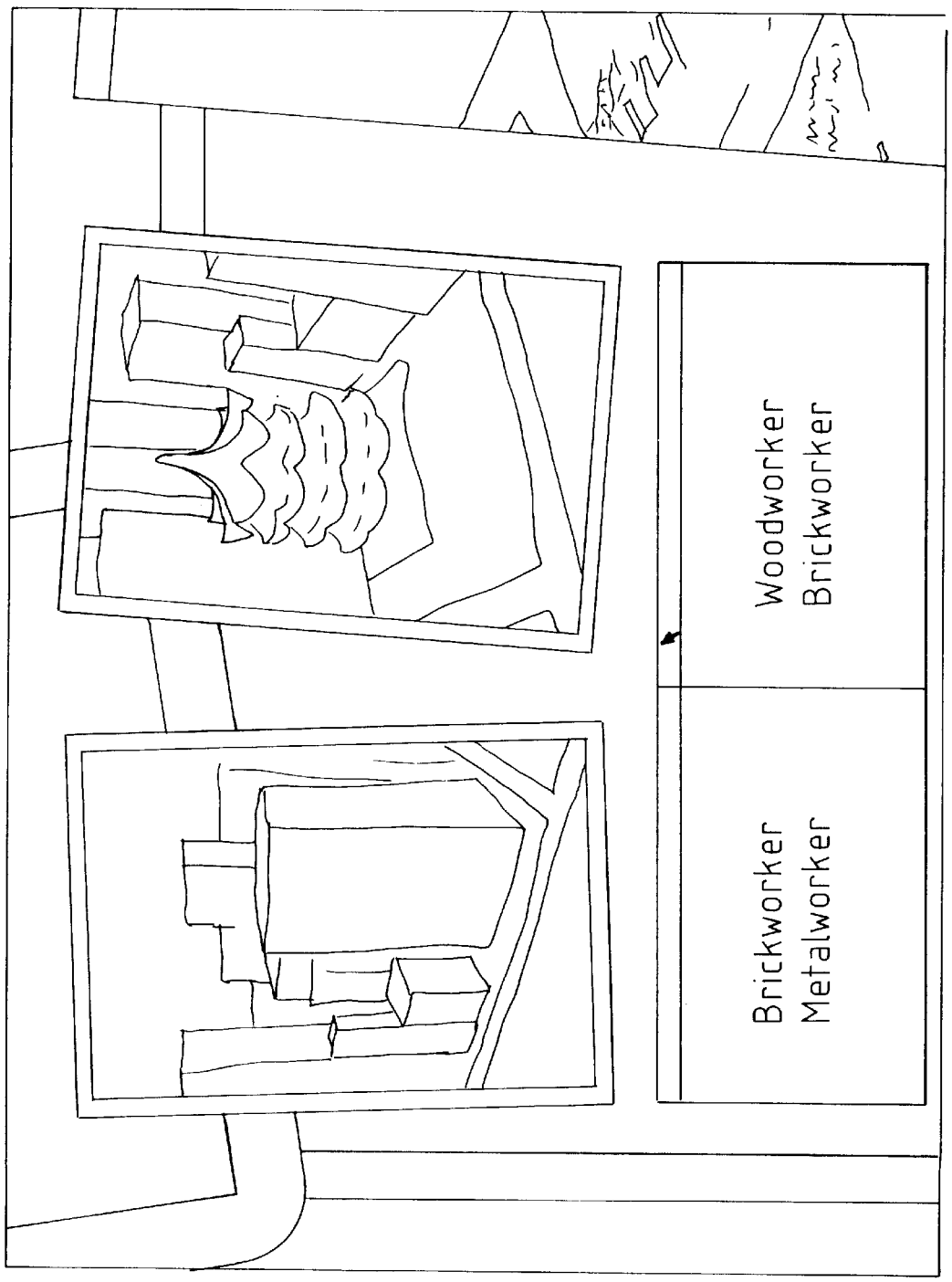

After the student has selected different types of tradespeople for the two lots, the computer runs animation movies showing the construction of the selected structure in different lots in step 408. The final structures will differ because of the different tradespeople selected by the student. FIG. 17C is a screen print of the resulting structures displayed to the student to illustrate the difference in results when picking different tradespeople.

Figure 17D:
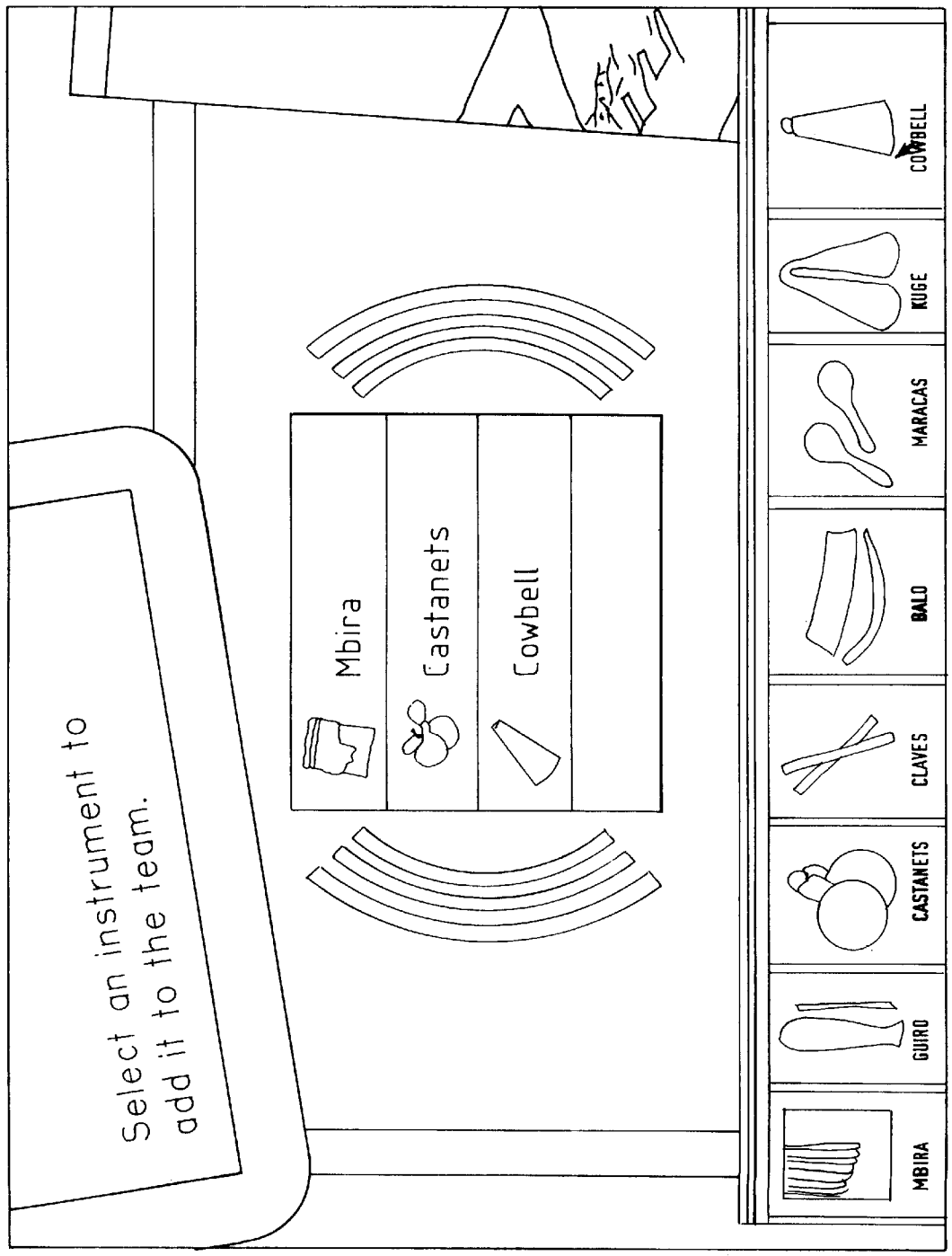

After the display in FIG. 17C, the program proceeds to step 410 in which the student is to construct a rhythmic pattern. The student is first given a display of eight percussion instruments in step 412. FIG. 17D displays the eight percussion instruments. When a student selects a percussion instrument in step 412, the booth computer 76 plays a digital audio sample of that instrument. As the student selects additional instruments, the instruments are added and the computer 76 plays a combination of those instrument sounds. The student may stack up to four tracks of the percussion instruments in the preferred embodiment. Additional tracks may be played simultaneously with the appropriate hardware and software modifications.

Figure 17E:
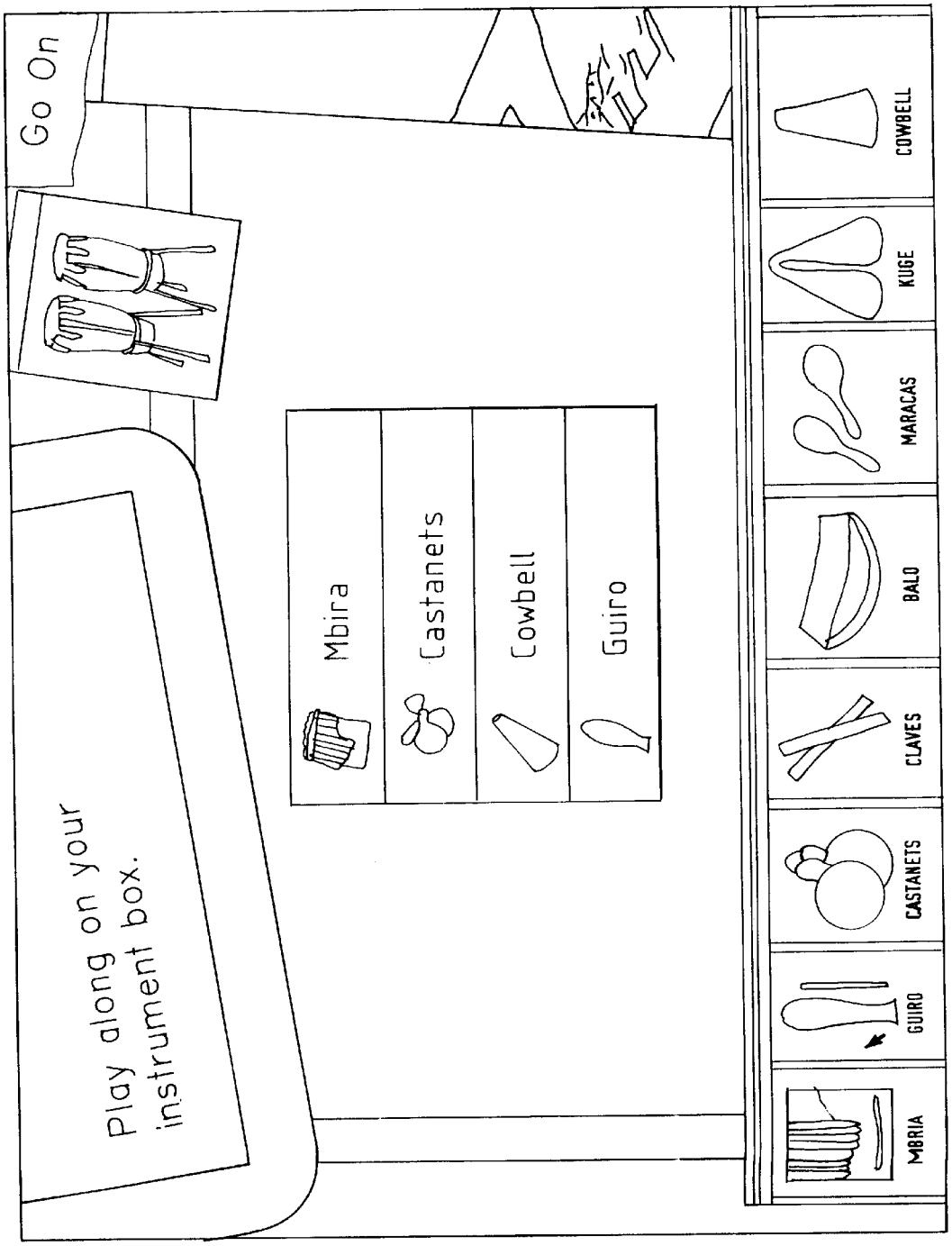

The student is then requested to play a rhythm on the control instrument box 50 using the note pads by a display shown in FIG. 17E. The student will then improvise a rhythm on the control instrument box 50 in step 414. The program allows a student to play along with the ensemble of percussion instruments for a set amount of time. The program then stores the composition by the student, input through the control instrument box 50, as a MIDI file in step 416. The computer 76 then plays the student's composition with the percussion instruments already playing.

Figure 17F:

The program then displays a screen asking the student to select an ensemble to listen to in step 418. FIG. 17F shows the screen which displays a thumbnail graphic representing five different types of ensembles. The user selects an ensemble by touching the appropriate thumbnail displayed on display 84. The computer 76 then displays a graphic of the selected ensemble and plays a prerecorded composition by the ensemble. The ensembles may be, for example, a jazz sextet, a string quartet, a Middle Eastern ensemble, an Irish Seishun group, or an African drumming ensemble. The program then will end.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. An education center for teaching multiple lessons on a subject to a group of students, the center comprising:
   a booth having physical space to accommodate at least one student;
   a processor located in the booth;
   a memory device coupled to the processor;
   a speaker mounted in the booth and coupled to the processor;
   a display mounted in the booth and coupled to the processor;
   an interface connector coupled to the processor;
   a removable control device which may be carried by a student, the control device matable with the interface connector and having a coupler for data communication with the processor and further having student operated inputs;
   a central server computer having a storage device storing a database having a record corresponding to the removable control device and other removable control devices carried by other students;
   a network connection coupled between the central server computer and the processor, the network connection capable of transmitting and receiving data between the central server computer and the processor; and
   wherein the processor is configured to instruct a student via the speaker or the display to operate the student operated inputs in a sequence and to respond to the student operated inputs to produce a multi-media response, and the central server computer recording the completion of the instruction of a student from the processor in the database.

2. The center of claim 1 further comprising a fixed student operated input device coupled to the processor and mounted in the booth.

3. The center of claim 2 wherein the fixed student operated input device is a touch screen and wherein the display is a touch screen.

4. The center of claim 2 wherein the fixed student operated input device is a keyboard.

5. The center of claim 2 wherein the fixed student operated input device is a trackball.

6. The center of claim 1 wherein the network connection is an Ethernet connection.

7. The center of claim 1 wherein the processor is capable of running an instructive program which instructs a student to create a composition by inputting a pattern using the inputs on the removable control device;
   wherein the processor transmits the composition to the central server computer; and
   wherein the central server computer stores the composition in the database record associated with the removable control device.

8. The system of claim 1 wherein the storage device holds multi-media programs and data, and wherein the processor outputs data in the multi-media data files through the display or the speakers in response to a student input through the fixed input.

9. The system of claim 8 wherein the multi-media programs include different lessons relating to a common theme and wherein the central processor records data in the database record indicating that the different lessons have been completed by the student.

10. The system of claim 9, further comprising:
    a second booth having physical space to accommodate at least one student, the second booth including:
      a processor located in the second booth;
      a memory device coupled to the processor;
      a speaker mounted in the second booth and coupled to the processor;
      a display mounted in the second booth and coupled to the processor;
      an interface connector coupled to the processor and matable with the removable control device;
        wherein the processor is configured to respond to the student operated inputs to produce a multi-media response;
        wherein the storage device holds a second set of multi-media programs and data, and wherein the processor outputs data in the second set of multi-media data files through the display or the speakers in response to a student input through the fixed input; and
        wherein the second set of multi-media programs include different lessons relating to a second common theme and wherein the central processor records data in the database record indicating that the different lessons have been completed by the student.

11. The system of claim 1 wherein the removable control device further includes:
    a top surface, wherein the student inputs are located on the top surface and include a plurality of note pads;
    a control device processor coupled to the note pads, the processor interpreting input signals from the note pads and outputs a MIDI signal; and
    wherein the processor plays the MIDI signal over the speaker.

12. The system of claim 11 wherein the control instrument box further includes a special effect pad located on the top surface;
    wherein the control box processor modifies the input signals from the note pads and outputs a modified MIDI signal when the special effect pad is pressed; and
    wherein the processor plays the modified MIDI signal over the speaker.

13. An education center for teaching multiple lessons on a subject to students, the center comprising:
    a booth having physical space to accommodate at least one student;
    a processor located in the booth;
    a memory device coupled to the processor;
    a speaker mounted in the booth and coupled to the processor;
    a display mounted in the booth and coupled to the processor;
    an interface connector coupled to the processor;
    a removable control device which may be carried by a student, the control device matable with the interface connector and having a coupler for data communication with the processor and further having student operated inputs;

a central server computer having a storage device storing a database having a record corresponding to removable control device;

a network connection coupled between the central server computer and the processor, the network connection capable of transmitting and receiving data between the central server computer and the processor; and wherein the removable control device has a stored unique identification data field;

wherein the processor is capable of responding to the student operated inputs to produce a multi-media response and runs an instructive program which instructs a student to create a composition by inputting a pattern using the inputs on the removable control device and transmits the composition to the central server computer;

wherein the central server computer stores the composition in the database record associated with the removable control device;

a station having multiple interface connectors matable with the removable control device;

a computer for mixing student compositions stored in the database record of the server corresponding to different removable control devices; and a playback device coupled to the computer for playing back student compositions.

14. The center of claim 13 wherein the playback device is a digital audio recorder.

15. A system for teaching a curriculum of different lessons relating to music to a student, the system comprising:

a control box having an adaptor, an input device and a memory which stores a unique identification data field;

a plurality of instruction booths, each with a booth computer, the instruction booths having sufficient physical space for accommodating at least one student, the booths including:

a display;

a speaker;

connector for electrical connection to the control box;

a user input device;

a memory device for storing lesson programs for each booth which are a part of the curriculum, with display and speaker data outputs, the lesson programs being interactive through the user input device and the control box and teaching students various preplanned lessons; and a processor which loads and plays the lesson programs and reads student operated data input from the user input device and the control box in accordance with the lesson programs;

a central computer coupled to each of the computers of the instruction booth, the central computer having a database with a record corresponding with each control box; the record including storage of student input data and data indicative of a student's exposure to the curriculum by the student visiting a selected number of the instruction booths and completing the lesson programs stored in the booth computers.

16. The system of claim 15, wherein the control box further includes:

a top surface having the input device, wherein the input device includes a plurality of note pads;

a control box processor coupled to the note pads, the processor interpreting input signals from the note pads and outputs a MIDI signal; and wherein the booth computer plays the MIDI signal over the speaker.

17. The system of claim 16 wherein the control instrument box further includes a special effects pad located on the top surface;

wherein the control box processor modifies the input signals from the note pads and outputs a modified MIDI signal when the special effect pad is pressed; and wherein the processor plays the modified MIDI signal over the speaker.

18. The system of claim 16 wherein the student may compose a composition by pressing the note pads on the control panel and wherein the central computer stores the composition as MIDI data in the database record corresponding to the control box.

19. The system of claim 16 wherein the memory device includes an instructional program which instructs the student how to use the control box by displaying graphics on the display and plays audio tracks on the speakers;

and wherein the booth plays the instructional program if a certain number of multi-media lessons are played.

20. The system of claim 16 further comprising a performance facility including:

a speaker for playing digital audio data;

a performance computer coupled to the central computer and the speaker, the performance computer having a memory with a prearranged composition;

a plurality of connectors which are matable to the control box; and wherein the performance computer reads the composition associated with control boxes on the connectors and combines the compositions with the prearranged composition as a combined audio digital file and plays the file on the speaker.

21. The system of claim 20 where in the central computer records the number of programs of the booth computers completed by the control box, and wherein the central computer instructs a student to use the performance facility after a set number of program lessons of the booths have been completed.

22. The system of claim 15 wherein the user input device is a touch screen, and wherein the program lessons in the memory device use the display as a touch screen for student input.

23. The system of claim 15 wherein the processor allows a student to use the input device to enter identification data and wherein the identification data is stored in the database record corresponding to the control box.

* * * * *